(12) United States Patent
Bratter et al.

(10) Patent No.: US 8,528,731 B2
(45) Date of Patent: Sep. 10, 2013

(54) LABELS, RELATED PADS THEREOF, AND RELATED METHODS

(75) Inventors: Adam Bratter, Newport Coast, CA (US); Douglas Wilson, San Dimas, CA (US); Debbie Caton, Redondo Beach, CA (US); Tracey Glenn, Altadena, CA (US); Peggy Diaz, Ontario (CA)

(73) Assignee: CCL Label, Inc., Framingham, MA (US)

( * ) Notice: Subject to any disclaimer, the term of this patent is extended or adjusted under 35 U.S.C. 154(b) by 87 days.

(21) Appl. No.: 12/831,245

(22) Filed: Jul. 6, 2010

(65) Prior Publication Data

US 2011/0259775 A1    Oct. 27, 2011

Related U.S. Application Data

(63) Continuation-in-part of application No. 29/360,189, filed on Apr. 21, 2010.

(51) Int. Cl.
*G09F 3/08*    (2006.01)

(52) U.S. Cl.
USPC ........................................ 206/447; 428/41.8

(58) Field of Classification Search
USPC ................ 206/440, 441, 447; 428/202, 40.1, 428/343, 41.8; 283/81; 40/641, 638
See application file for complete search history.

(56) References Cited

U.S. PATENT DOCUMENTS

| | | | |
|---|---|---|---|
| 167,045 A | 8/1875 | Wilkerson | |
| 616,438 A | 12/1888 | Newkirk | |
| 959,938 A | 5/1910 | Hunter | |
| 1,098,044 A | 5/1914 | Leitch | |
| D46,315 S | 8/1914 | Mettler | |
| 1,843,947 A | 2/1932 | Ellery | |
| 1,873,610 A | 8/1932 | Lyon | |
| 2,103,389 A | * 12/1937 | Salfisberg | 222/107 |
| 2,170,147 A | 8/1939 | Lane | |

(Continued)

FOREIGN PATENT DOCUMENTS

| | | |
|---|---|---|
| DE | 10140274 | 1/2003 |
| EP | 0309107 | 7/1993 |

(Continued)

OTHER PUBLICATIONS

Restriction requirement dated Mar. 17, 2011 from prior U.S. Appl. No. 29/360,189.

(Continued)

*Primary Examiner* — David Fidei

(74) *Attorney, Agent, or Firm* — Christie, Parker & Hale, LLP

(57) ABSTRACT

A label is provided that includes a body portion having an area, a front surface, and a back surface. The label also includes a tab portion having an area and a back surface, and the tab portion is integrally coupled to the body portion and extending from an end of the body portion. A line of weakness divides the tab portion and the body portion, and the line of weakness is formed such that the tab portion is selectively separable from the body portion along the line of weakness. A layer of adhesive is provided on the back surface of the body portion of the label, and a majority of the back surface of the tab portion is free of adhesive. The area of the tab portion is less than the area of the body portion.

9 Claims, 21 Drawing Sheets

(56) References Cited

U.S. PATENT DOCUMENTS

| | | | |
|---|---|---|---|
| 2,192,472 A | 3/1940 | Huston | |
| 2,213,666 A | 9/1940 | Burke | |
| 2,248,317 A * | 7/1941 | Van Cleef | 206/447 |
| 2,415,248 A | 2/1947 | Kenna et al. | |
| 2,486,840 A | 11/1949 | Harris | |
| 2,679,928 A * | 6/1954 | Bishop, Jr. et al. | 206/447 |
| 2,724,601 A | 11/1955 | Fuerst et al. | |
| 2,953,865 A | 9/1960 | Heuser | |
| 3,065,978 A | 11/1962 | Stephens | |
| 3,583,358 A | 6/1971 | Hanson, Jr. | |
| 4,570,797 A | 2/1986 | Weinman | |
| 4,650,706 A | 3/1987 | Emmel | |
| 4,680,210 A | 7/1987 | Corcoran | |
| 4,696,706 A | 9/1987 | Griffin et al. | |
| H377 H | 12/1987 | Greig | |
| D293,694 S | 1/1988 | Alden et al. | |
| 4,746,018 A * | 5/1988 | Mueller | 206/447 |
| 4,770,320 A | 9/1988 | Miles et al. | |
| 4,842,919 A | 6/1989 | David et al. | |
| 4,876,131 A | 10/1989 | Ashby et al. | |
| 4,895,746 A | 1/1990 | Mertens | |
| 4,927,179 A | 5/1990 | Ehret et al. | |
| 4,928,814 A * | 5/1990 | Rondot et al. | 206/215 |
| 4,970,984 A | 11/1990 | Vazquez | |
| 5,050,909 A | 9/1991 | Mertens et al. | |
| 5,064,222 A | 11/1991 | Legault | |
| 5,153,041 A | 10/1992 | Clements et al. | |
| 5,154,962 A | 10/1992 | Mertens et al. | |
| 5,195,265 A | 3/1993 | Klingenberg | |
| 5,227,209 A * | 7/1993 | Garland | 428/42.1 |
| 5,283,091 A | 2/1994 | Darvell et al. | |
| 5,299,833 A | 4/1994 | Madole, Jr. | |
| 5,299,834 A | 4/1994 | Kraige | |
| 5,342,688 A | 8/1994 | Kitchin et al. | |
| 5,366,776 A | 11/1994 | Mertens | |
| D354,991 S | 1/1995 | DeSutter | |
| 5,390,819 A | 2/1995 | Kaye | |
| 5,464,672 A | 11/1995 | Jackson | |
| 5,484,168 A | 1/1996 | Chigot | |
| D368,487 S | 4/1996 | Lindberg | |
| 5,607,067 A | 3/1997 | Morrissey | |
| 5,641,550 A | 6/1997 | Berman et al. | |
| 5,663,227 A | 9/1997 | Birkholz et al. | |
| 5,705,244 A | 1/1998 | Lee | |
| 5,743,565 A | 4/1998 | Zimmanck | |
| 5,755,355 A | 5/1998 | Timmerman et al. | |
| 5,756,187 A | 5/1998 | Kuo et al. | |
| 5,782,494 A | 7/1998 | Crandall et al. | |
| D397,733 S | 9/1998 | Walker | |
| 5,827,591 A | 10/1998 | Blok et al. | |
| 5,863,629 A | 1/1999 | Kuo et al. | |
| 5,874,144 A | 2/1999 | Kumar et al. | |
| 5,902,440 A | 5/1999 | Jenkins | |
| 5,947,523 A | 9/1999 | Liegard | |
| 5,948,494 A | 9/1999 | Levin | |
| 5,958,536 A | 9/1999 | Gelsinger et al. | |
| 5,964,375 A | 10/1999 | Carlson et al. | |
| 5,989,667 A | 11/1999 | Tayebi | |
| 6,045,002 A | 4/2000 | Wierschke | |
| 6,071,583 A | 6/2000 | Pomerantz | |
| 6,096,469 A | 8/2000 | Anderson et al. | |
| 6,129,965 A | 10/2000 | Langan | |
| 6,132,831 A | 10/2000 | Thomas-Cote | |
| D433,838 S | 11/2000 | O'Hara | |
| 6,150,035 A | 11/2000 | DeFife et al. | |
| 6,168,848 B1 | 1/2001 | Heath | |
| 6,231,943 B1 | 5/2001 | Nijboer et al. | |
| 6,254,955 B1 | 7/2001 | Kuo et al. | |
| 6,268,032 B1 | 7/2001 | Mertens et al. | |
| 6,286,871 B1 | 9/2001 | Spector et al. | |
| 6,296,932 B1 | 10/2001 | Crandall et al. | |
| 6,326,072 B1 | 12/2001 | Ojeda et al. | |
| 6,352,751 B1 | 3/2002 | Miles et al. | |
| 6,352,766 B1 | 3/2002 | Crandall et al. | |
| 6,403,189 B1 | 6/2002 | Donahue | |
| 6,435,967 B1 | 8/2002 | Michlin | |
| 6,471,817 B1 | 10/2002 | Emmert | |
| 6,482,487 B1 | 11/2002 | Donahue | |
| 6,503,591 B2 | 1/2003 | Kuo et al. | |
| 6,514,585 B1 | 2/2003 | Pearson et al. | |
| 6,544,640 B1 | 4/2003 | Miles et al. | |
| D483,405 S * | 12/2003 | Bratter et al. | D19/2 |
| 6,703,096 B2 | 3/2004 | Sabella | |
| 6,712,396 B2 | 3/2004 | Derraugh | |
| D491,606 S | 6/2004 | Jour | |
| 6,756,100 B2 | 6/2004 | Pearson et al. | |
| 6,773,769 B1 | 8/2004 | Schulz | |
| 6,886,685 B2 | 5/2005 | Slater | |
| 6,979,480 B1 | 12/2005 | Schulz et al. | |
| D519,566 S | 4/2006 | Jour | |
| 7,040,051 B2 | 5/2006 | Windorski | |
| 7,073,692 B2 * | 7/2006 | Weyts | 222/541.9 |
| 7,128,957 B2 | 10/2006 | Bratter | |
| 7,182,217 B2 | 2/2007 | Windorski et al. | |
| 7,225,570 B2 | 6/2007 | Windorski | |
| 7,288,163 B2 | 10/2007 | Weirather et al. | |
| D555,511 S * | 11/2007 | Warmka et al. | D9/722 |
| 7,290,953 B2 | 11/2007 | Regala | |
| D556,829 S | 12/2007 | Jour | |
| 7,306,690 B2 | 12/2007 | Hodsdon et al. | |
| 7,351,457 B1 | 4/2008 | Williard | |
| 7,374,631 B1 | 5/2008 | Weirather et al. | |
| D610,612 S | 2/2010 | Rhee | |
| D613,451 S | 4/2010 | Welsh | |
| 7,901,719 B2 | 3/2011 | Aldridge | |
| 2002/0160183 A1 | 10/2002 | Hanakawa | |
| 2002/0192415 A1 | 12/2002 | Vogler et al. | |
| 2003/0077413 A1 | 4/2003 | Shah | |
| 2003/0082327 A1 | 5/2003 | Pearson et al. | |
| 2003/0184636 A1 | 10/2003 | Graham et al. | |
| 2004/0108228 A1 | 6/2004 | Rall et al. | |
| 2004/0217022 A1 | 11/2004 | Irvine et al. | |
| 2005/0000842 A1 | 1/2005 | Timmerman et al. | |
| 2005/0076550 A1 | 4/2005 | Sills | |
| 2005/0095384 A1 | 5/2005 | Wittmeyer | |
| 2006/0024462 A1 | 2/2006 | Kuo et al. | |
| 2006/0046592 A1 | 3/2006 | Novelli | |
| 2006/0062956 A1 | 3/2006 | Chandaria et al. | |
| 2006/0068143 A1 | 3/2006 | Chandaria et al. | |
| 2006/0068145 A1 | 3/2006 | Chandaria | |
| 2006/0088683 A1 * | 4/2006 | Wilson | 428/40.1 |
| 2006/0134363 A1 | 6/2006 | Nadeau et al. | |
| 2006/0138768 A1 | 6/2006 | Abaygar et al. | |
| 2006/0151098 A1 | 7/2006 | Rutsky | |
| 2006/0154098 A1 | 7/2006 | Dollase et al. | |
| 2006/0198979 A1 | 9/2006 | McConkie et al. | |
| 2006/0216451 A1 | 9/2006 | Weiner et al. | |
| 2007/0059472 A1 | 3/2007 | Kitchin | |
| 2008/0011626 A1 | 1/2008 | Bodziak et al. | |
| 2008/0020163 A1 | 1/2008 | Salva Calcagno | |
| 2008/0061547 A1 | 3/2008 | Jour | |
| 2008/0085384 A1 | 4/2008 | Ylitalo et al. | |
| 2008/0085385 A1 | 4/2008 | Ylitalo et al. | |
| 2008/0113139 A1 | 5/2008 | Tokutsu et al. | |
| 2008/0190799 A1 * | 8/2008 | Dotta | 206/441 |
| 2009/0039638 A1 | 2/2009 | Jour | |
| 2009/0075007 A1 | 3/2009 | Kitchin et al. | |
| 2009/0160173 A1 | 6/2009 | Jour | |
| 2010/0116425 A1 | 5/2010 | Konsti et al. | |
| 2011/0259775 A1 | 10/2011 | Bratter et al. | |

FOREIGN PATENT DOCUMENTS

| | | |
|---|---|---|
| EP | 0579423 | 4/1997 |
| EP | 885752 | 12/1998 |
| EP | 1174845 | 1/2002 |
| EP | 1574357 | 5/2007 |
| GB | 752968 | 7/1956 |
| WO | WO 02/100655 A1 | 12/2002 |
| WO | WO 2010/117991 | 10/2010 |

OTHER PUBLICATIONS

Amendment and response dated Apr. 5, 2011 from prior U.S. Appl. No. 29/360,189.

CA Office Action for Canadian Application No. 135694; dated Jul. 27, 2010; 2 pages.
Response for Canadian Application No. 135694; dated Nov. 29, 2010; 20 pages.
CA Office Action Restriction for Canadian Application No. 135694; dated Jan. 4, 2011; 2 pages.
Response for Canadian Application No. 135694; dated Apr. 15, 2011; 7 pages.
Patent Issue for Canadian Application No. 135694; dated Sep. 30, 2011; 4 pages.
Patent Issue for Canadian Application No. 140221; dated Sep. 30, 2011; 4 pages.
Patent Issue for Canadian Application No. 140219; dated Sep. 30, 2011; 3 pages.
Patent Issue for Canadian Application No. 140220; dated Sep. 30, 2011; 3 pages.
Patent Issue for Canadian Application No. 138153; dated Sep. 30, 2011; 4 pages.
CA Office Action Restriction for Canadian Application No. 138154; dated Dec. 17, 2010; 2 pages.
Response for Canadian Application No. 138154; dated Apr. 15, 2011; 5 pages.
Patent Issue for Canadian Application No. 138154; dated Sep. 30, 2011; 4 pages.
Patent Issue for Canadian Application No. 138155; dated Sep. 30, 2011; 3 pages.
Patent Issue for Canadian Application No. 138156; dated Sep. 30, 2011; 3 pages.
Patent Issue for Canadian Application No. 138157; dated Sep. 30, 2011; 3 pages.
Patent Issue for Canadian Application No. 138158; dated Sep. 30, 2011; 3 pages.
CA Office Action Restriction for Canadian Application No. 138150; dated Dec. 17, 2010; 2 pages.
Response for Canadian Application No. 138150; dated Apr. 15, 2011; 4 pages.
Patent Issue for Canadian Application No. 138150; dated Sep. 30, 2011; 3 pages.
Patent Issue for Canadian Application No. 138151; dated Sep. 30, 2011; 4 pages.
Patent Issue for Canadian Application No. 138152; dated Sep. 30, 2011; 4 pages.
MX Office Action Restriction for Mexican Application No. MX/f/2010/001410; dated Mar. 11, 2011; 3 pages.
Response for Mexican Application No. MX/f/2010/001410; dated Jun. 20, 2011; 8 pages.
Notice of Allowance for Mexican Application No. MX/f/2010/001410; dated Jul. 18, 2011; 1 page.
Notice of Allowance for Mexican Application No. MX/f/2011/002025; dated Nov. 15, 2011; 1 page.
Notice of Allowance for Mexican Application No. MX/f/2011/002026; dated Nov. 15, 2011; 1 page.
Notice of Allowance for Mexican Application No. MX/f/2011/002027; dated Sep. 15, 2011; 1 page.
Notice of Allowance for Mexican Application No. MX/f/2011/002028; dated Nov. 15, 2011; 1 page.
Notice of Allowance for Mexican Application No. MX/f/2011/002029; dated Nov. 15, 2011; 1 page.
Notice of Allowance for Mexican Application No. MX/f/2011/002030; dated Sep. 15, 2011; 1 page.
Notice of Allowance for Mexican Application No. MX/f/2011/002031; dated Sep. 15, 2011; 1 page.
Ex Parte Quayle Action for U.S. Appl. No. 29/408,525; dated Apr. 24, 2012; 8 pages.
Ex Parte Quayle Response for U.S. Appl. No. 29/408,525; dated Jun. 21, 2012; 36 pages.
Notice of Allowance for U.S. Appl. No. 29/408,525; dated Aug. 22, 2012; 29 pages.
Notice of Allowance for U.S. Appl. No. 29/408,525; dated Oct. 2, 2012; 10 pages.
Notice of Allowance for U.S. Appl. No. 29/408,525; dated Dec. 28, 2012; 7 pages.
US Office Action for U.S. Appl. No. 29/408,527; dated May 10, 2012; 33 pages.
US Final Office Action for U.S. Appl. No. 29/408,527; dated Nov. 6, 2012; 6 pages.
Ex Parte Quayle Action for U.S. Appl. No. 29/408,528; dated Jun. 21, 2012; 30 pages.
Ex Parte Quayle Response for U.S. Appl. No. 29/408,528; dated Aug. 21, 2012; 35 pages.
Notice of Allowance for U.S. Appl. No. 29/408,528; dated Oct. 2, 2012; 11 pages.
Notice of Allowance for U.S. Appl. No. 29/408,528; dated Dec. 28, 2012; 7 pages.
Ex Parte Quayle Action for U.S. Appl. No. 29/408,529; dated Jun. 22, 2012; 30 pages.
Ex Parte Quayle Response for U.S. Appl. No. 29/408,529; dated Aug. 21, 2012; 34 pages.
Notice of Allowance for U.S. Appl. No. 29/408,529; dated Oct. 2, 2012; 11 pages.
Notice of Allowance for U.S. Appl. No. 29/408,529; dated Dec. 28, 2012; 7 pages.
International Search Report and Written Opinion for Application No. PCT/US2012/040793 filed Jun. 4, 2012, dated Aug. 22, 2012, mailed Aug. 29, 2012; 11 pages.
US Office Action for U.S. Appl. No. 29/360,189; dated Jun. 24, 2011; 5 pages.
Amendment and Response for U.S. Appl. No. 29/360,189; dated Dec. 15, 2011; 6 pages.
US Office Action, Restriction Requirement for U.S. Appl. No. 29/360,189; dated Feb. 10, 2012; 8 pages.
US Office Action, Response Restriction Requirement for U.S. Appl. No. 29/360,189; dated Aug. 9, 2012; 11 pages.
US Final Office Action for U.S. Appl. No. 29/360,189; dated Oct. 2, 2012; 6 pages.
Transparent Stick Notes Global b2b Network; URL; dated Nov. 22, 2008, Germes LLC; http://web.archive.org/web/20081122094958/http:/www.global-b2b-network.com/b2b/51/52/1060/label__sticker__and__self__adhesive__note.html; 2 pages.
US Response to Non-Final Office Action for U.S. Appl. No. 29/408,527; dated Sep. 10, 2012; 20 pages.
US Response to Final Office Action for U.S. Appl. No. 29/360,189; dated Dec. 3, 2012, 7 pages.
US Advisory Action for U.S. Appl. No. 29/360,189; dated Dec. 14, 2012; 5 pages.
Response to after Final Office Action for U.S. Appl. No. 29/360,189; filed Mar. 4, 2013; 13 pages.
Notice of Allowance for U.S. Appl. No. 29/360,189; dated Mar. 27, 2013; 8 pages.
Preliminary Amendment for U.S. Appl. No. 13/857,360; filed Apr. 5, 2013; 10 pages.
Continued Prosecution Application for U.S. Appl. No. 29/360,189; filed Apr. 5, 2013; 3 pages.
Response to after final Office action for U.S. Appl. No. 29/408,527; filed Apr. 5, 2013; 18 pages.

* cited by examiner

LABELS, RELATED PADS THEREOF, AND RELATED METHODS

CROSS-REFERENCE TO RELATED APPLICATIONS

The present application is a continuation-in-part of U.S. patent application Ser. No. 29/360,189, filed Apr. 21, 2010, entitled "Labels and Related Pads of Labels" by Adam Bratter, Douglas Wilson, Debbie Caton, Tracey Glenn, and Peggy Diaz, which is incorporated herein by reference in its entirety.

FIELD OF THE INVENTION

The present inventive subject matter relates generally to the art of adhesive-backed labels. Particular relevance is found in connection with labels having substantially adhesive-free tabs, and accordingly the present specification makes specific reference thereto. However, it is to be appreciated that aspects of the present inventive subject matter are also equally amenable to other like applications.

BACKGROUND

Adhesive-backed labels are generally known. However, some prior art adhesive-backed labels can exhibit certain drawbacks. For example, adhesive-backed labels are known to be provided in sheets and/or rolls containing multiple labels. In these cases, the labels are commonly arranged on a release liner which is generally unwanted waste material. As each label traditionally occupies its own area on the release liner, a substantial amount of release liner is typically used in such applications.

Additionally, traditional adhesive-backed labels have a layer of adhesive covering the entire back surface thereof. Accordingly, it is difficult to grasp and/or apply the labels without touching or coming into contact with the adhesive.

Accordingly, a new and/or improved adhesive-backed label and/or pads thereof are disclosed which address the above-referenced problem(s) and/or others.

SUMMARY

In accordance with one exemplary embodiment, a label is provided that includes a body portion having an area, a front surface, and a back surface. The label also includes a tab portion having an area and a back surface, and the tab portion is integrally coupled to the body portion and extending from an end of the body portion. A line of weakness divides the tab portion and the body portion, and the line of weakness is formed such that the tab portion is selectively separable from the body portion along the line of weakness. A layer of adhesive is provided on the back surface of the body portion of the label, and a majority of the back surface of the tab portion is free of adhesive. The area of the tab portion is less than the area of the body portion.

In other, more detailed features of the invention, the layer of adhesive can extend over the line of weakness to partially cover the back surface of the tab portion. Also, the layer of adhesive can be pattern coated. In addition, the layer of adhesive can cover substantially all of the back surface of the body portion. The adhesive of the adhesive layer can also be selected from the group including a removable pressure sensitive adhesive and an ultra-removable adhesive.

In other, more detailed features of the invention, the label has a thickness and the line of weakness is a perforated line that includes a plurality of discontinuous breaks extending through the thickness of the label with intermittent lands of intact areas arranged between adjacent discontinuous breaks. Also, the label has an edge and an opposing edge, and the line of weakness can extend from the edge of the label to the opposing edge of the label. The line of weakness can also be substantially a straight line with a pair of arced segments at opposing ends with each of the segments forming at least one rounded corner on the body portion of the label.

In other, more detailed features of the invention, the tab portion includes at least one rounded corner and the body portion includes at least one rounded corner. The at least one rounded corner of the tab portion of the label and the at least one rounded corner of the body portion form a notch. The label can include a pair of notches formed in the edges of the label, with the notches being co-located with opposing ends of the line of weakness. Also, each notch can be formed from at least one rounded corner of the tab portion of the label and at least one rounded corner of the body portion of the label.

In other, more detailed features of the invention, the label has a front surface and an opposite adhesive-bearing back surface. The label further includes a release coating provided on the front surface of the label opposite the adhesive-bearing back surface. Also, the release coating can be printable or writable.

In other, more detailed features of the invention, the label further includes a preprinted graphic on the front surface of the label opposite the adhesive-bearing back surface. Additionally, the graphic can be a loop arranged proximate to the border of the body portion of the label. Also, the graphic can be a stripe arranged proximate to at least one edge of the label. Furthermore, the preprinted graphic can be under the release coating.

Another exemplary embodiment is a pad including a plurality of labels. Each of the plurality of labels includes a body portion having an area, a front surface, and a back surface. Each of the plurality of labels also includes a tab portion integrally coupled to the body portion and extending from an end of the body portion. A line of weakness divides the tab portion and the body portion, and the line of weakness is formed such that the tab portion is selectively separable from the body portion along the line of weakness. A layer of adhesive is provided on the back surface of the body portion of the label, and a majority of the back surface of the tab portion is free of adhesive. The area of the tab portion is less than the area of the body portion. The plurality of labels is stacked one on top of the other such that the overlying label is releasably adhered to the front surface of the adjacent underlying label via the adhesive layer on the back surface of the overlying label.

In other, more detailed features of the invention, the pad further includes a release liner to which the bottom-most label in the pad is releasably adhered via the adhesive layer on the back surface of the bottom-most label. The release liner has an outer periphery that substantially matches an outer periphery of the labels.

Another exemplary embodiment is a package including a plurality of pads and a support structure. The support structure has a base portion to which the plurality of pads is secured. Each pad includes a plurality of labels, and each of the plurality of labels has a body portion and a tab portion integrally coupled to the body portion and extending from an end of the body portion. A line of weakness divides the tab portion and the body portion, and the line of weakness is formed such that the tab portion is selectively separable form the body portion along the line of weakness. A layer of adhesive is provided on the back surface of the body portion of the label, and a majority of the back surface of the tab portion is free of adhesive. The area of the tab portion is less than the area of the body portion. The plurality of labels includes an overlying label that has a back surface and an underlying label adjacent to the overlying label. The underlying label has a front surface. The plurality of labels is stacked one on top of the other such that the overlying label is releasably adhered to the front surface of the adjacent underlying label via the adhesive layer on the back surface of the overlying label.

In other, more detailed features of the invention, the support structure of the package further has a cover joined to the base portion by a hinge. The cover is selectively swingable about the hinge between a closed position and an open position. In the closed position, at least one of the plurality of pads is sandwiched between the cover and the base portion of the support structure. In the open position, at least one pad is revealed from underneath the cover. Also, the base portion of the support structure, the cover, and the hinge can all be formed from an integral piece of material. Additionally, the hinge can include a pair of fold lines formed in the integral piece of material, with the fold lines separating the cover and the base portion.

An exemplary method according to the invention is a method for manufacturing a package of labels. The method includes providing a base layer with a first side and a second side, and an adhesive. The method also includes coating a layer of the adhesive onto the second side of the base layer forming a label stock and sheeting the label stock into individual sheets. The individual sheets are stacked into at least one stack of sheets, and the at least one stack of sheets is die cut into at least one pad of labels.

In other, more detailed features of the invention, the method can include the base layer having paper.

In other, more detailed features of the invention, the method further includes coating a release layer onto the first side of the base layer. Also, the method can further include coating a primer between the base layer and the adhesive layer. Additionally, the method can further include perforating the base layer.

In other, more detailed features of the invention, the method further includes adhering the label stock to a release liner. Also, the method can further include adhering the at least one label pad to a backing card. Additionally, adhering the at least one pad of labels to the backing card can include gluing.

Another exemplary method according to the invention is a method for using a pad of labels. The method includes providing a pad of labels that includes at least one label and writing on one of the at least one labels. The method also includes removing one of the at least one labels from the pad of labels and applying the removed label to an object.

In other, more detailed features of the invention, the step of writing on one of the at least one labels is after the step of removing one of the at least one labels from the pad of labels.

In other, more detailed features of the invention, the method further includes removing a tab portion from one of the at least one labels. Also, the step of removing the tab portion can be after the step of applying the removed label to an object.

In other more detailed features of the invention, the method further includes removing the label from the object.

Numerous advantages and benefits of the inventive subject matter disclosed herein will become apparent to those of ordinary skill in the art upon reading and understanding the present specification.

BRIEF DESCRIPTION OF THE DRAWING(S)

The inventive subject matter disclosed herein can take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENT(S)

Figure 1:
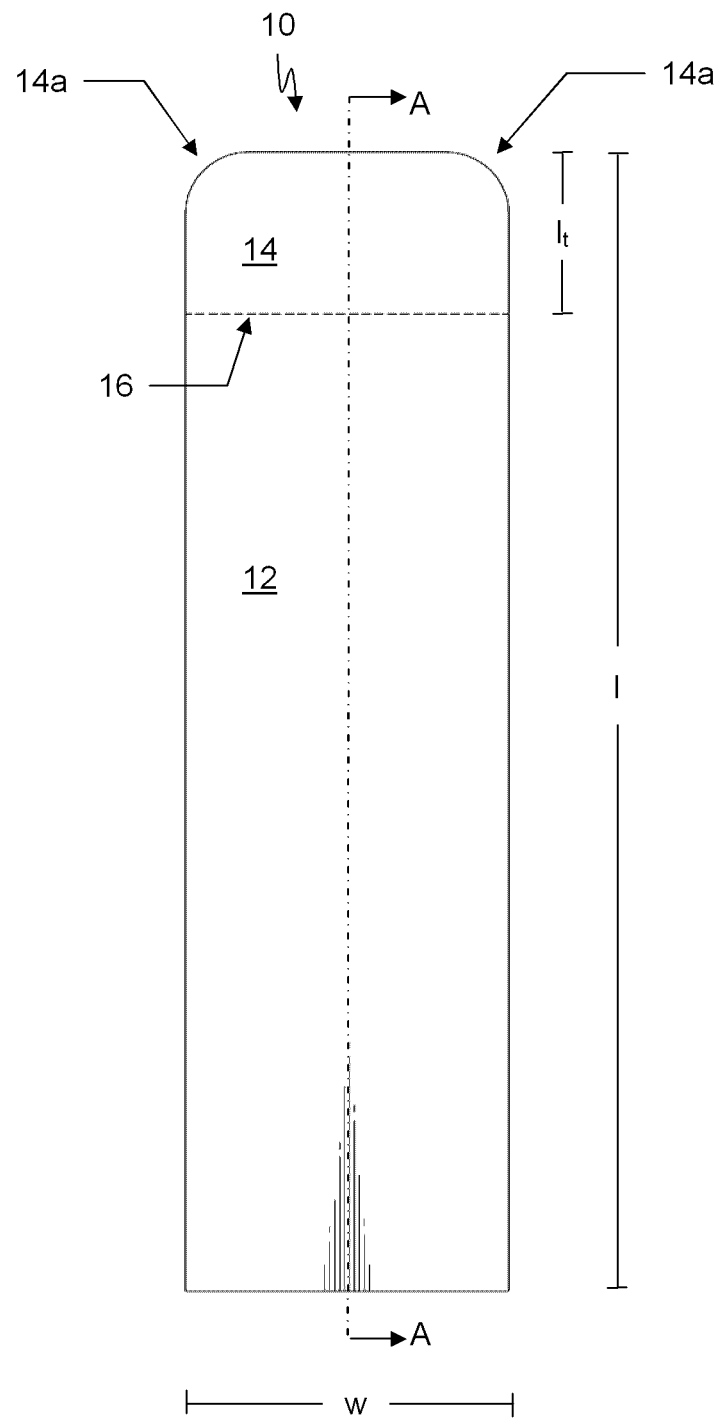
FIG. 1 is a top plan view of an exemplary embodiment of a label having an attached tab having two rounded corners that is configured to be separated from the label along a perforation.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

With reference now to FIGS. 1-8, there are shown adhesive-backed labels 10 according to various exemplary embodiments of the present inventive subject matter. In each case, the label 10 includes a generally rectangular body portion 12 and a selectively removable tab portion 14 distinct from the body portion 12. Suitably, the body and tab portions 12 and 14 are joined to one another or otherwise integrally formed. A line of weakness 16 is formed in the label 10 thereby dividing the body and tab portions 12 and 14 from one another and/or otherwise defining the respective distinct portions.

Figure 2:
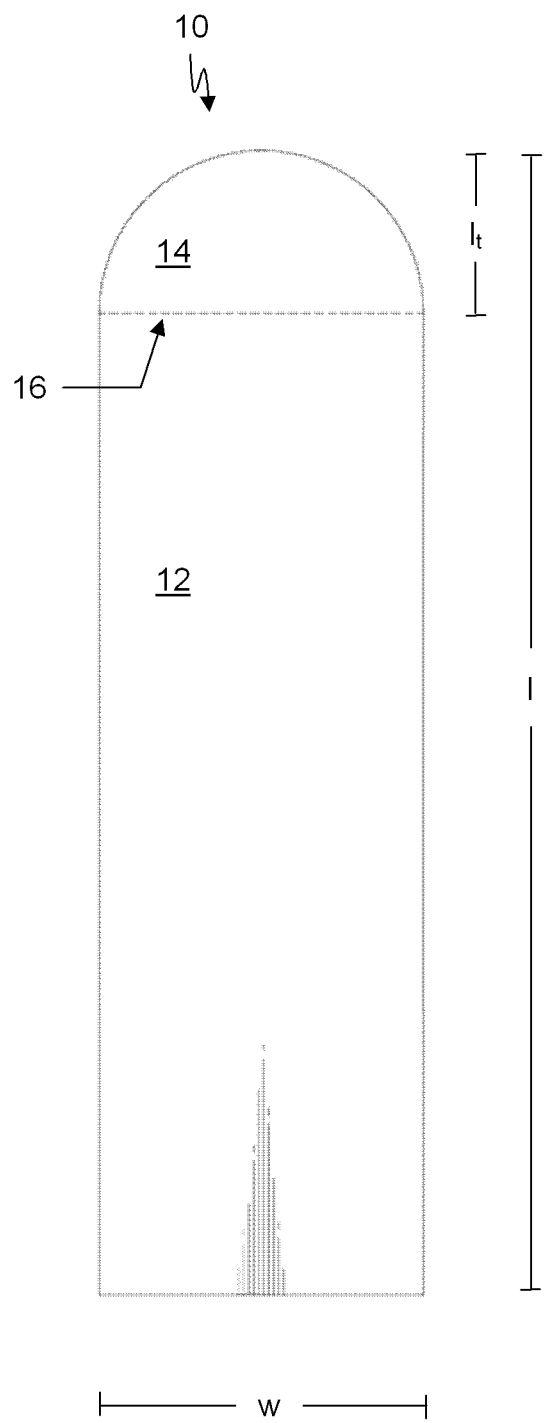
FIG. 2 is a top plan view of an exemplary embodiment of a label having an attached rounded tab that is configured to be separated from the label along a perforation.
Figure 3:
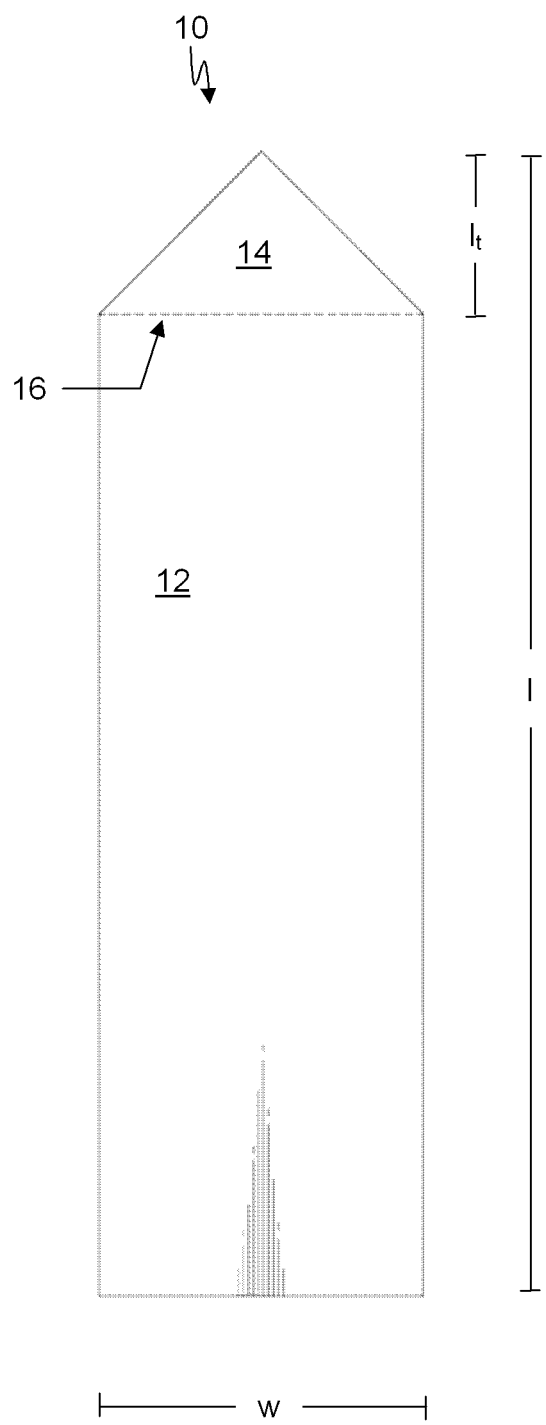
FIG. 3 is a top plan view of an exemplary embodiment of a label having an attached triangular tab that is configured to be separated from the label along a perforation.
Figure 4:
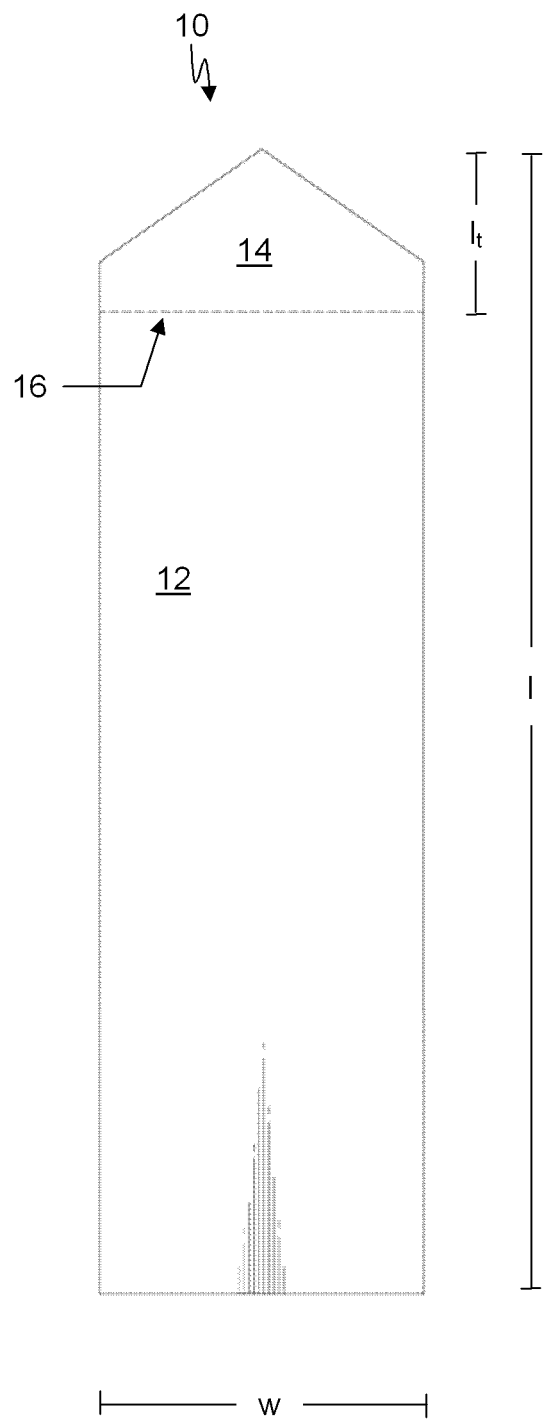
FIG. 4 is a top plan view of an exemplary embodiment of a label having an attached pentagonal tab that is configured to be separated from the label along a perforation.
Figure 5:
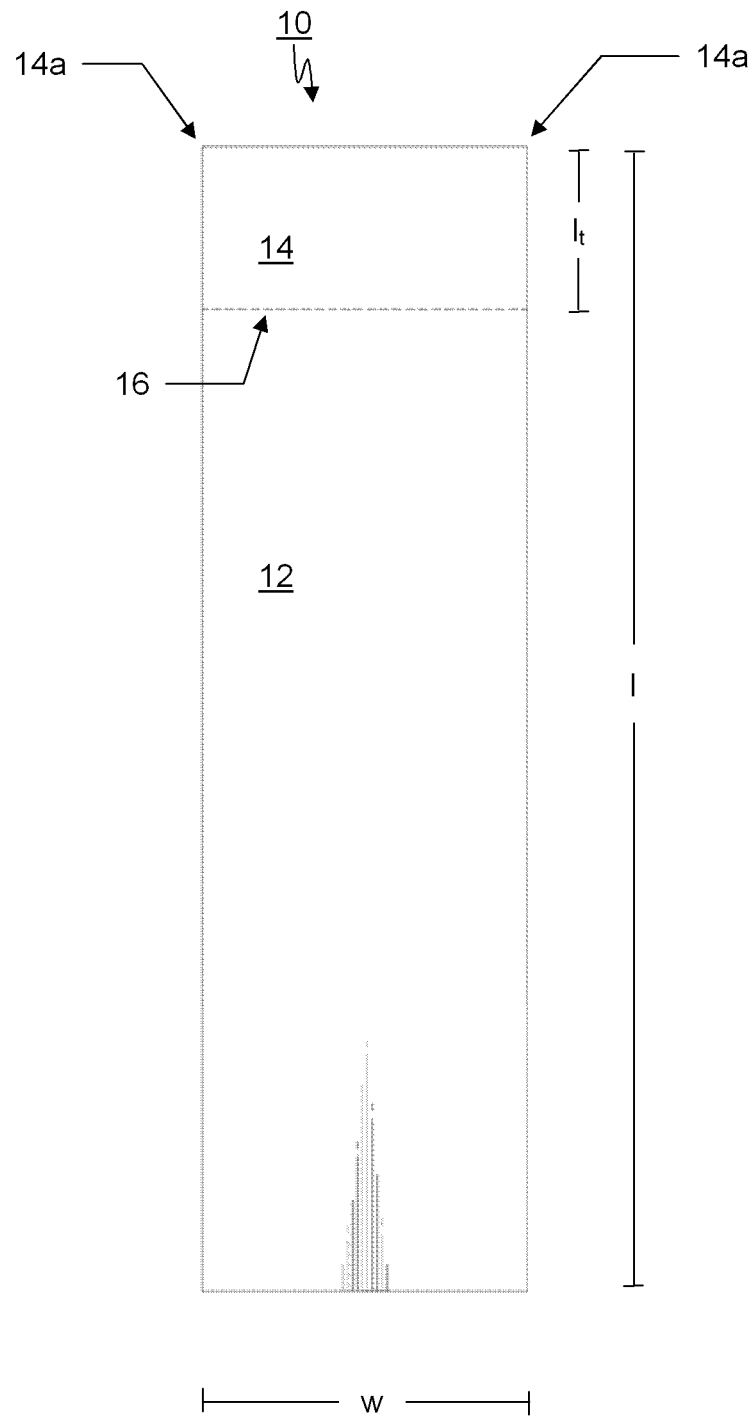
FIG. 5 is a top plan view of an exemplary embodiment of a label having an attached rectangular tab that is configured to be separated from the label along a perforation.
Figure 6:
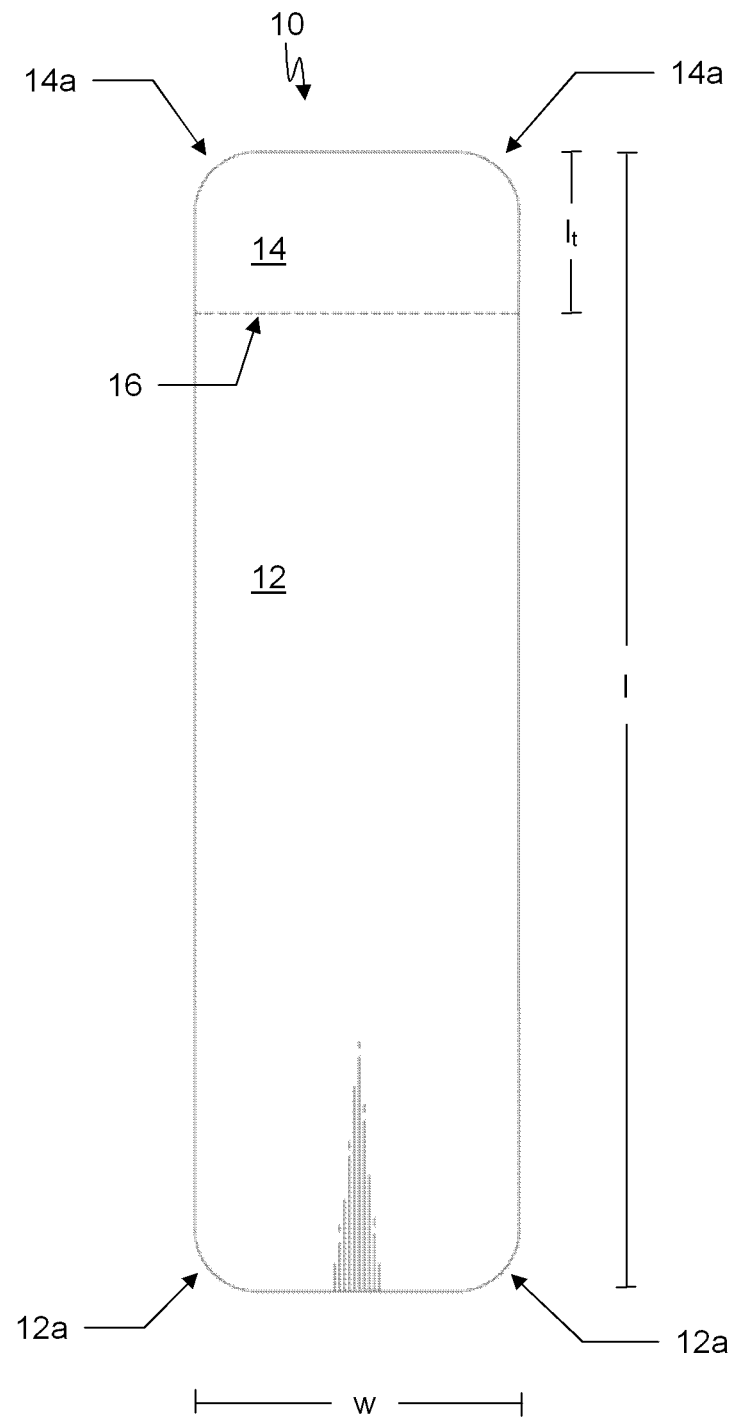
FIG. 6 is a top plan view of an exemplary embodiment of a label having two rounded corners and an attached tab having two rounded corners that is configured to be separated from the label along a perforation.
Figure 7:
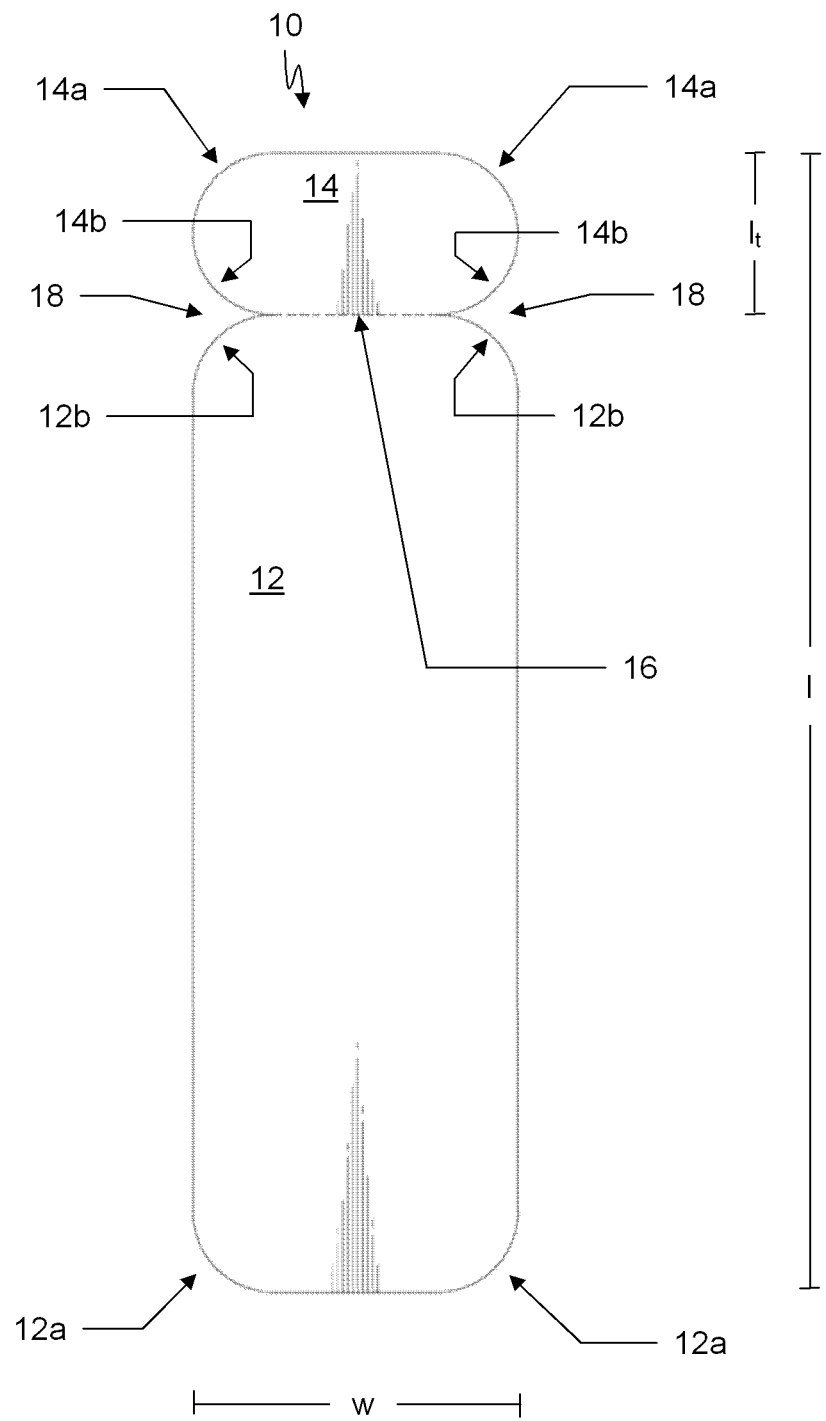
FIG. 7 is a top plan view of an exemplary embodiment of a label having four rounded corners and an attached tab having four rounded corners that is configured to be separated from the label along a perforation.
Figure 8:
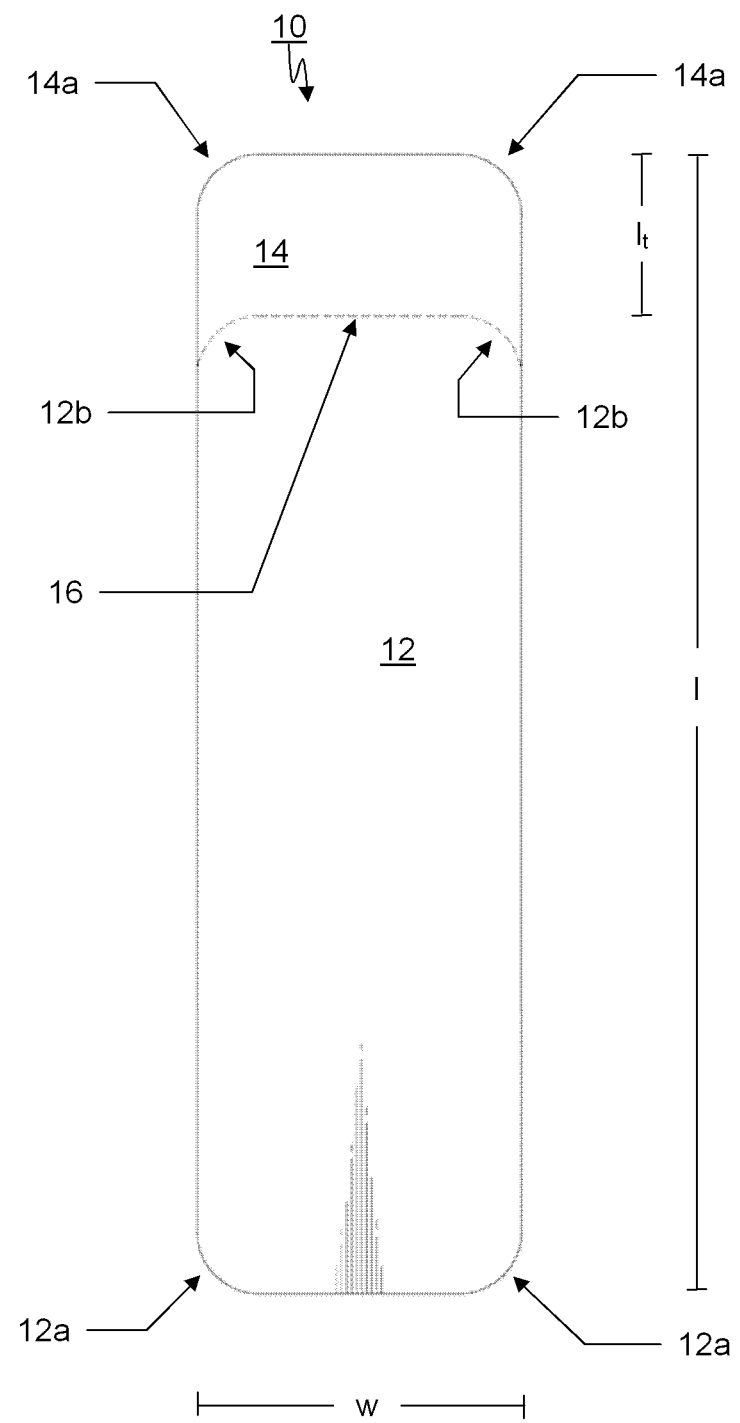
FIG. 8 is a top plan view of an exemplary embodiment of a label having four rounded corners and an attached tab having two rounded corners that is configured to be separated from the label along a perforation having two curved portions.

The exact shape or perimeter profile of the label 10 and/or the respective portions thereof can vary in accordance with particular embodiments. For example, as illustrated in FIG. 1, the label 10 can have a generally rectangular shaped tab portion 14 with corners 14a that are rounded; as illustrated in FIG. 2, the label 10 can have a generally semi-circular shaped tab portion 14; as illustrated in FIG. 3, the label can have a generally triangular shaped tab portion 14; as illustrated in FIG. 4, the label 10 can have a generally pentagonal shaped tab portion 14; as illustrated in FIG. 5, the label 10 can have a generally rectangular shaped tab portion 14, this time with corners 14a with edges that generally form right angles; as illustrated in FIGS. 6-8, optionally the corners 12a of the body portion 12 of the label 10 can also be rounded; and, as illustrated in FIGS. 7 and 8, optionally either one or both the body portion 12 and the tab portion 14 can have corners 12b and 14b, respectively, that are also rounded. Of course, it is to be appreciated, that other suitable shapes and/or perimeter profiles can also be employed for the body potion 12, the tab portion 14 and/or the overall label 10.

Suitably, the label 10 has as overall length 'l' and an overall width 'w'. For example, in one embodiment the label suitably has an overall length dimension from approximately 1.5 inches to approximately 6.5 inches and an overall width dimension from approximately 0.5 inch to approximately 3 inches. In any event, the ratio of l:w is suitably from approximately 1:1 to approximately 6:1. In alternative embodiments, the label has an overall length dimension from approximately 3.5 inches to approximately 4.5 inches, and an overall width dimension from approximately 0.667 inch to approximately 2 inches. Of course, it is to be appreciated, that other suitable dimensions can also be employed for various embodiments of the label 10.

Figure 9A:
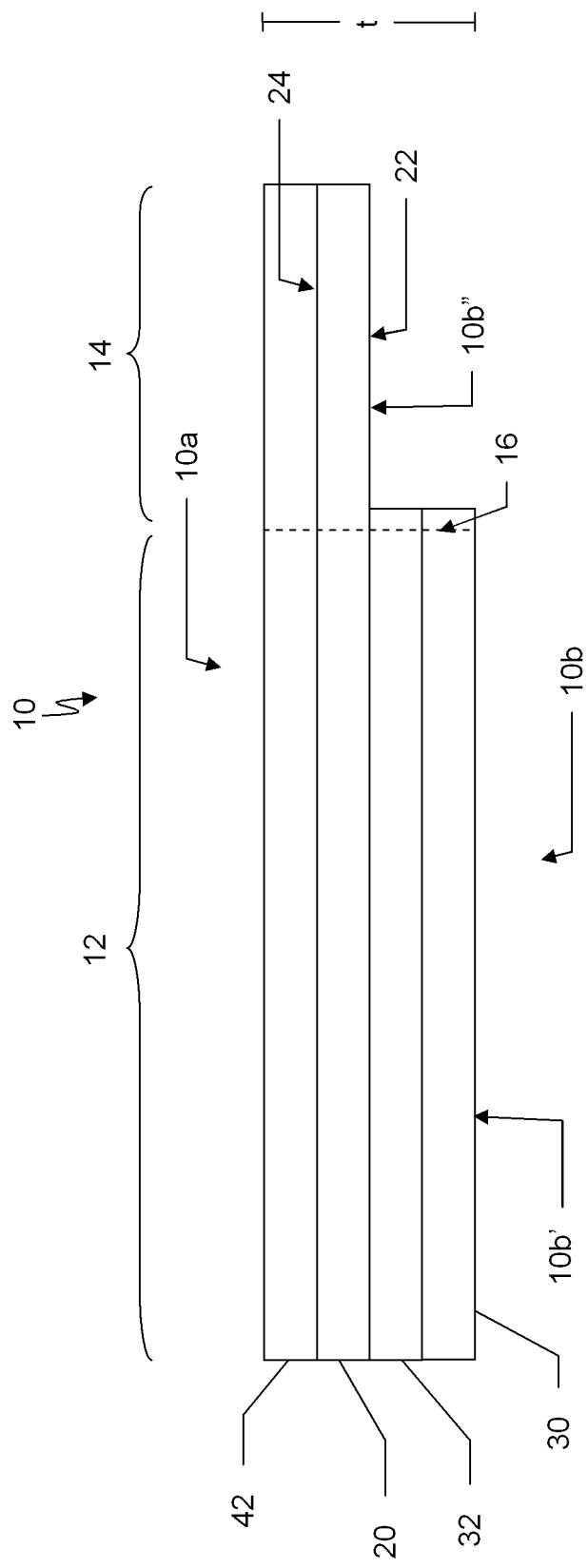
FIG. 9a is cross section view taken along section line A-A of FIG. 1, showing one exemplary embodiment of a multi-layer construction of the label.

FIG. 9a shows an exemplary cross section of the label 10. As shown, the cross section is taken along A-A through the embodiment shown in FIG. 1, however, it is to be appreciated that the same or similar cross section is also applicable to FIGS. 2-8. As shown, the label 10 is suitably a coated, multi-layer and/or laminate construction having a first or front surface 10a and an opposite second or back surface 10b. The construction includes a base layer 20, e.g., such as paper. Optionally, the base layer 20 can also be polymeric film, for example, polyolefin, polyvinylchloride, polyester, polystyrene, polycarbonate, or other film-forming polymer films; synthetic paper; laminated paper; or laminated films. Suitably, the base layer 20 is a unitary and/or integral material that extends and/or defines the entire expanse of the label 10, including both the body and the tab portions 12 and 14. In one suitable embodiment, the thickness of the base layer 20 is from approximately 0.5 mil to approximately 10 mils, and in yet another suitable embodiment, the base layer 20 is approximately 4 mils thick.

On a first major surface or back surface 22 of the base layer 20, a removable or repositionable adhesive layer 30 is provided. The adhesive used in adhesive layer 30 is, for example, an ultra-removable (UR) pressure sensitive adhesive (PSA), such as, for example, UR2 (Avery Dennison Corporation of Pasadena, Calif.), MICRONAX 240-00 (Franklin International of Columbus, Ohio), or GEL-TAC (Paper Conversions, Inc. (PCI) of Syracuse, N.Y.) or alternatively, for example, a removable PSA, such as, for example, COVINAX 210-00 (Franklin International of Columbus, Ohio) or R-423 (Avery Dennison Corporation of Pasadena, Calif.). Suitable adhesives, for example, include the ultra-removable, removable, and repositionable adhesives disclosed in U.S. Pat. Nos. 4,810,763 to Mallya, et al.; 4,944,888 to Mallya, et al.; and 5,656,705 to Mallya, et al., all of which are incorporated by reference herein in their entirety. Optionally, a primer layer 32 is interposed between the back surface 22 of the base layer 20 and the adhesive layer 30 to enhance the anchorage of the adhesive layer 30 to the base layer 20. Suitable primers for the primer layer 32 can be prepared by using, for example, a pigment and a binder. Suitable pigments include, for example, magnesium hydroxide, magnesium carbonate, magnesium sulfate, calcium oxide, calcium hydroxide, calcium carbonate, satin white, calcium silicate, zinc oxide, titanium oxide, aluminum oxide, aluminum hydroxide, talc, or kaolin. Suitable binders include, for example, starch, polyvinyl alcohol, carboxymethylcellulose, styrene-butadiene copolymer, an acrylic copolymer, or a vinyl acetate copolymer. For example, suitable primers are disclosed in U.S. Pat. No. 5,670,226 to Yoshizawa, et al., which is incorporated by reference herein in its entirety. Of course, any number of known primers can be used as desired. The coat weight for the adhesive layer 30 and/or primer layer 32, combined, is suitably in a range from approximately 4 grams per square meter (gsm) to approximately 15 gsm. In one suitable embodiment, the coat weight is approximately 7 gsm, and in another suitable embodiment the coat weight is approximately 13 gsm.

Suitably, the adhesive layer 30 covers all or most of the back surface 10b' of the body portion 12 of the label 10, but does not overlap the back surface 10b'' of the tab portion 14 of the label 10. Alternatively, as illustrated, the adhesive layer 30 can extend somewhat over the line of weakness 16 and onto the back surface 22 of the base layer 20, which forms part of the tab portion 14 of the label 10. In any event, however, the majority of the back surface 10b" of the tab portion 14 of the label 10 is free from adhesive. For example, suitably the adhesive layer 30 does not extend more than approximately 0.08 inch past the line of weakness 16, or by area, at least approximately 80% to approximately 98% of the back surface 10b" of the tab portion 14 of the label 10 is free from adhesive. In another suitable embodiment, the adhesive layer 30 does not extend more than approximately 0.04 inch past the line of weakness 16. In still another embodiment, the adhesive layer does not extend more than approximately 0.02 inch past the line of weakness 16.

As can be appreciated, the substantially complete coverage of the back surface 10b' of the body portion 12 of the label 10 with adhesive layer 30 promotes better adhesion when the label 10 is adhered to a document, file folder or other object. Alternatively, the adhesive layer 30 can be pattern coated or otherwise cover less than the entire back surface 10b' of the body portion 12 of the label 10.

Figure 13:
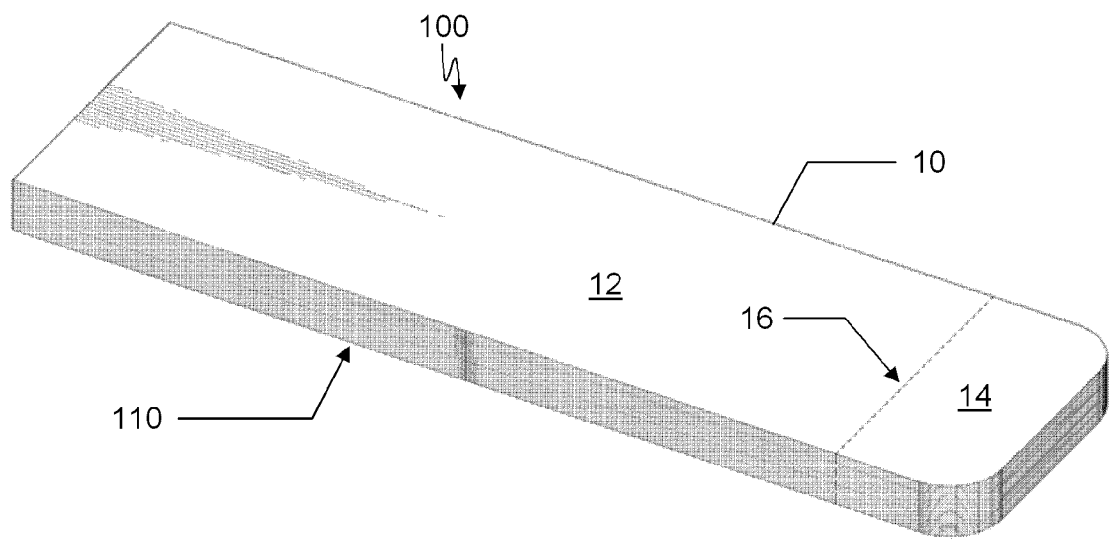
FIG. 13 is a top perspective view showing an exemplary pad of labels including a plurality of the labels from FIG. 1 stacked one on top of the other and including a carrier sheet.

With additional reference now to FIG. 13, it is to be appreciated that optionally a plurality of labels 10 as described herein can be provided in the form of a pad 100, i.e., with the plurality of labels 10 being stacked one on top of the other such that each overlying label 10 is removably and/or releasably adhered to a front surface 10a of its adjacent underlying counterpart via the adhesive layer 30 on the back surface 10b of the respective label 10. As used herein, the term "plurality" means two or more. Accordingly, depending on the aggressiveness of the adhesive layer 30, which is used on the back surfaces 10b of the labels 10, optionally, a release coating or layer 42 (see FIGS. 9a and 9b) is formed on the front surface 10a of each label 10 (e.g., on a second major surface or front surface 24 of the base layer 20) to promote the desired release of the adhesive layer 30 therefrom. Layers of release coatings can be from approximately 0.2 mil to approximately 0.5 mil. Suitable release coatings for the release layer 42 include SECOAT 163 (Omnova Solutions, Inc. of Fairlawn, Ohio) and RA-120W (Mayzo, Inc. of Norcross, Ga.), for example. In addition, an optional ink receptive or other suitable topcoat (not shown) can also be employed to enhance the label's ability to receive and/or retain markings, e.g., from ink, toner, highlighters, pens, pencils, etc. It should be appreciated that an alternative to the combination of ink receptive topcoat and release coating is a printable or writable release system, for example, the release systems as disclosed in U.S. Pat. No. 6,074,747 to Scholz, et al., U.S. Pat. No. 7,309,731 to Shih, et al. and WO 2000/052080 to Hseih, et al., all of which are incorporated by reference herein in their entirety.

Referring back to FIG. 9a, the optional release coat 42 covers all or most of the front surface 24 of the base layer 20, i.e., including both the body and tab portions 12 and 14 of the label 10. Alternatively, however, the optional release coat 42 can only cover that area coextensive with the area where adhesive layer 30 resides on the opposite side of the base layer 20. In any event, suitably the front surface 24 of the base layer 20 is writable or retains good writability and/or ink reception properties, e.g., such that a user can mark the same as desired with a standard writing implement, e.g., pencil, ballpoint pen, rollerball, gel pen, highlighter, marker, etc., or with a typewriter, printer, or copier.

In one suitable embodiment, the line of weakness 16 is formed by a perforated or microperforated line extending substantially the entire width 'w' of the label 10, or from one edge to an opposing edge. The line of weakness can be used to separate the tab portion of the label from the body portion. The perforated line is suitably made up of a plurality of discontinuous cuts or breaks extending completely through the entire thickness T of the label 10, with intermittent lands of uncut or intact areas being arranged between adjacent cuts or breaks. Alternatively, the line of weakness 16 can be formed by scoring, or partial die or laser cutting, or other cutting which does not extend entirely through the thickness T of the label 10. In any event, suitably, the line of weakness 16 provides sufficient strength to prevent inadvertent, unwanted, or unintentional separation or folding along the line 16 under normal use and/or wear, while still facilitating easy separation along the line 16 when folding, tearing, or other like forces are intentionally applied. For example, where the base layer 20 is a 4 mils thick paper and the line of weakness 16 is implemented as per the previously described perforation, the perforated line is suitably formed by cuts or breaks that measure approximately 0.04 inch in length with interposed lands that measure approximately 0.04 inch in length. Alternatively, the line of weakness 16 is a microperforated line formed by equal lengths of cuts and lands of approximately 33 cuts/inch. It should be appreciated that the exact count and spacing of perforations is not critical, as long as the line of weakness is sufficiently strong to facilitate removal of the label from the pad, yet weak enough to facilitate removal of the tab portion from the body portion when desired.

In suitable embodiments, the perforated line forming the line of weakness 16 begins and ends at the edges of the label 10 with a land. A perforation with land elements at each end thereof will promote resistance to tearing along the line of weakness 16, unless and/or until a purposeful tearing or other like separating force is applied.

Optionally, as shown in FIG. 7, the body portion 12 of the label 10 is formed with rounded corners 12b and the tab portion 14 of the label 10 is formed with rounded corners 14b, thereby defining a pair of notches 18 in opposing edges of the label 10. Suitably, the notches 18 in the edges of the label 10 are co-located with each end of the line of weakness 16. In this manner, the notches 18 aid in identifying for the user the locations of the line of weakness 16 and assist in directing and easing separation along the line of weakness 16 when appropriate tearing or other suitable forces are applied.

Suitably, the line of weakness 16 is a substantially straight line that runs substantially parallel to the direction of the width 'w' of the label 10 and/or substantially normal to the direction of the length 'l' of the label 10, wherein the length 'l' defines the longer of the two mutually orthogonal outermost dimensions of the label 10. See, e.g., FIGS. 1-7. For example, the line of weakness 16 optionally divides the label 10 across its length 'l' so that the tab portion 14 has a length 'l$_t$' of approximately 0.5 inch. Of course, other suitable dimensions for 'l$_t$' are also possible for selected applications. Optionally, as shown in FIG. 8, the line of weakness 16 can bend or arc at opposing ends thereof to form and/or otherwise define rounded corners 12b on the body portion 12 of the label 10.

Figure 10:
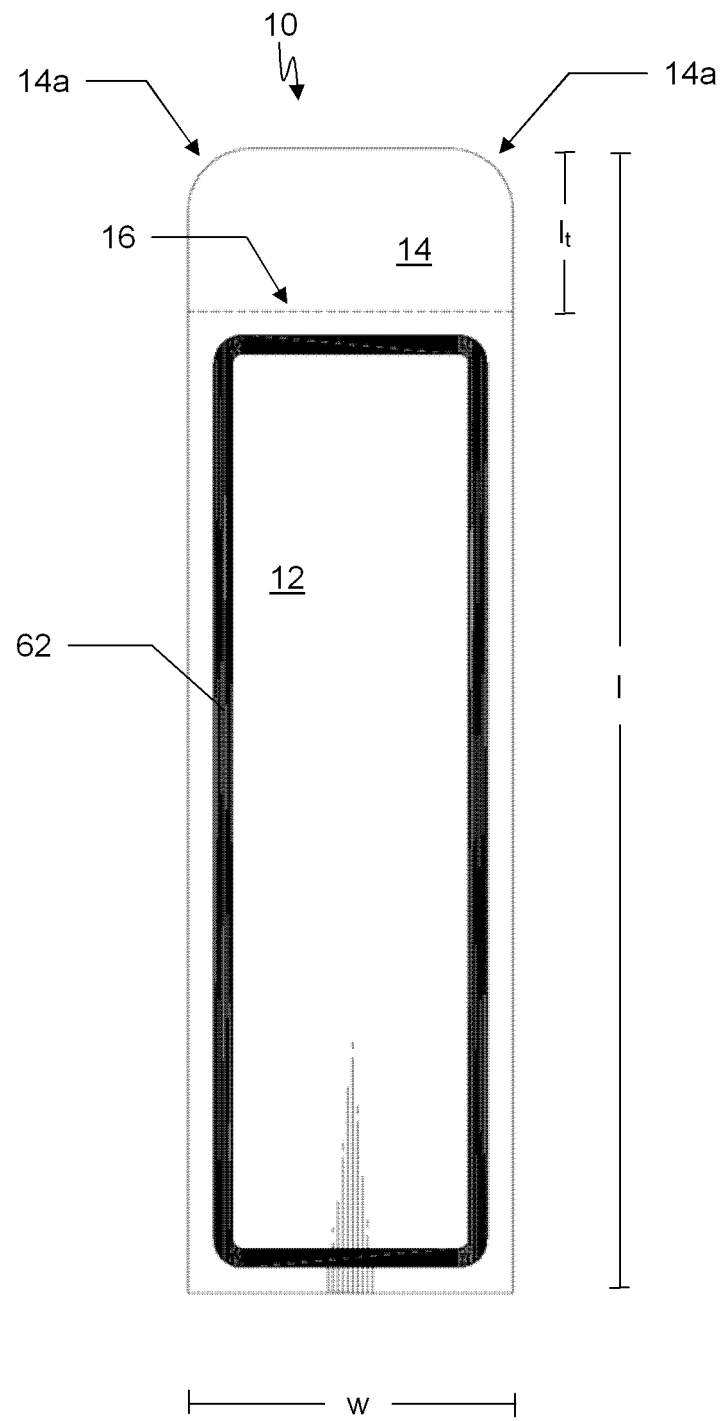
FIG. 10 is a top plan view of an exemplary embodiment of a label having a rounded-edge rectangular border on the label's top surface, and the label having an attached tab with two rounded corners that is configured to be separated from the label along a perforation.
Figure 11:
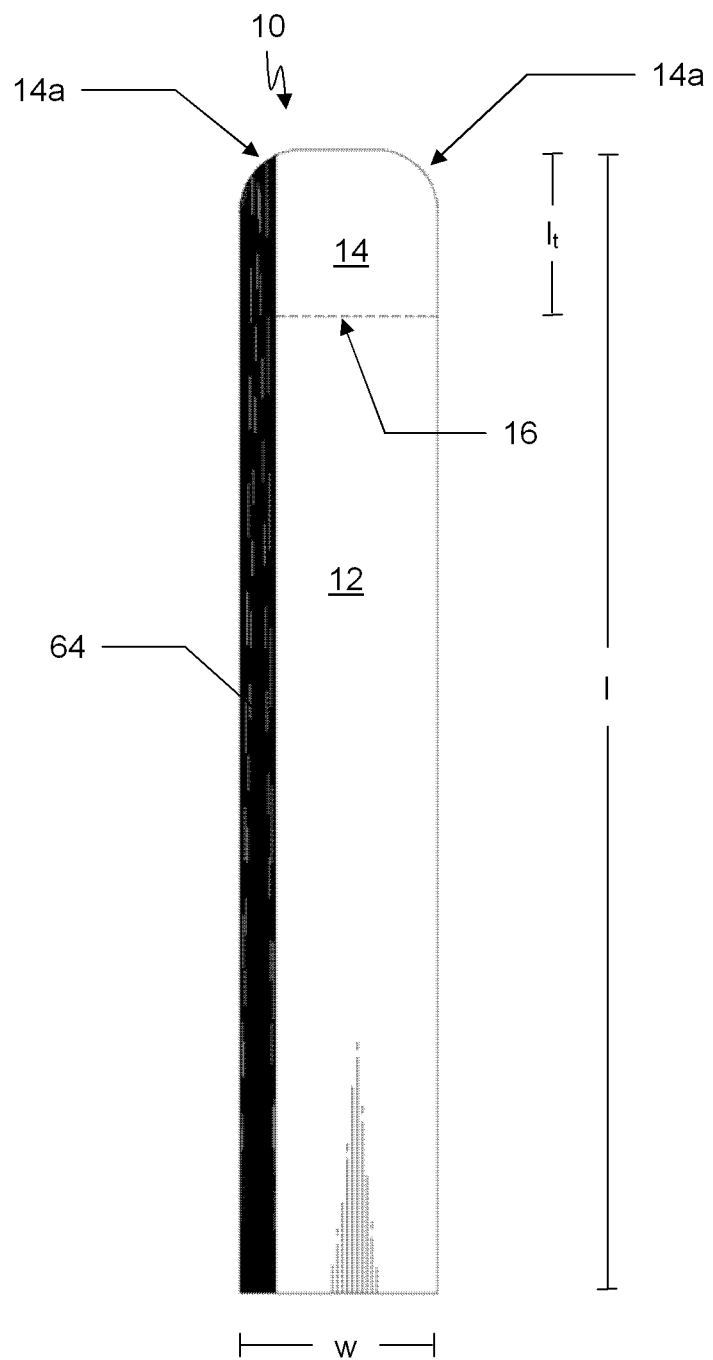
FIG. 11 is a top plan view of an exemplary embodiment of a label having an attached tab having two rounded corners that is configured to be separated from the label along a perforation, and the label and tab having a border along one edge of the label and the tab.
Figure 12:
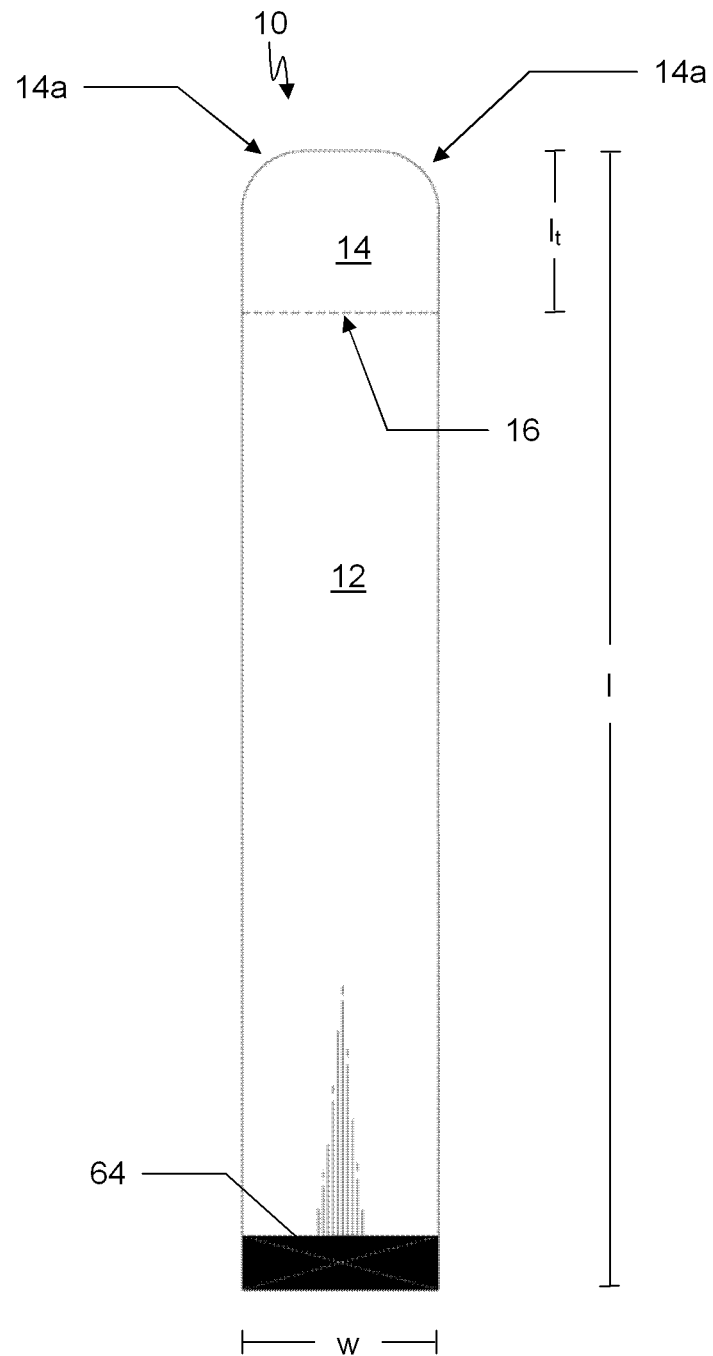
FIG. 12 is a top plan view of another exemplary embodiment of a label having a border along one edge of the label, and an attached tab having two rounded corners that is configured to be separated from the label along a perforation.

With reference to FIGS. 10-12, optionally, the label 10 is preprinted with selected graphics or other indicia on a front surface 10a thereof. For example, as shown in FIG. 10, the body portion 12 of the label 10 is optionally preprinted with an annular or closed loop graphic 62 proximal to the edge or border of the body portion, i.e., at or near the periphery thereof. Specifically shown in FIG. 10 is a rounded-edge rectangular border. Accordingly, the graphic 62 can serve to readily identify for a user the approximate bounds of the body portion 12 of the label 10, e.g., so that a user can selectively confine their marking of the label 10 therein. In one embodiment, the label 10 is a file folder label, for example, as shown in FIGS. 11 and 12. Optionally, e.g., as shown in FIGS. 11 and 12, the front surface 10a of the label 10 can be preprinted with a thick line or stripe 64 located along the top edge of the label 10 so as to extend across both the body portion 12 and tab portion 14 of the label 10 (FIG. 11), or the bar can be located along a side edge of the label 10, e.g., so as to extend across only the body portion 12 of the label 10 and not the tab portion 14 (FIG. 12). Suitably, the bar 64 or the graphic 62 can be color coded or otherwise used to communicate desired information to a user or viewer of the label 10. Optionally, the border graphic 62 and/or bars 64 can be colored any variety of colors including, for example, red, blue, green, yellow, black, or any combination thereof. Of course, the color of the label 10 (with or without preprinted graphics) can also similarly be provided in any of a variety of colors, e.g., by using a base layer 20 of the corresponding color desired. Suitably, the label 10 and/or base layer 20 is provided in a neon color. While certain embodiments of the label 10 have been used to illustrate the preprinting in FIGS. 10-12, it is to be appreciated that any of the label embodiments disclosed herein can in practice be likewise preprinted.

Figure 9B:
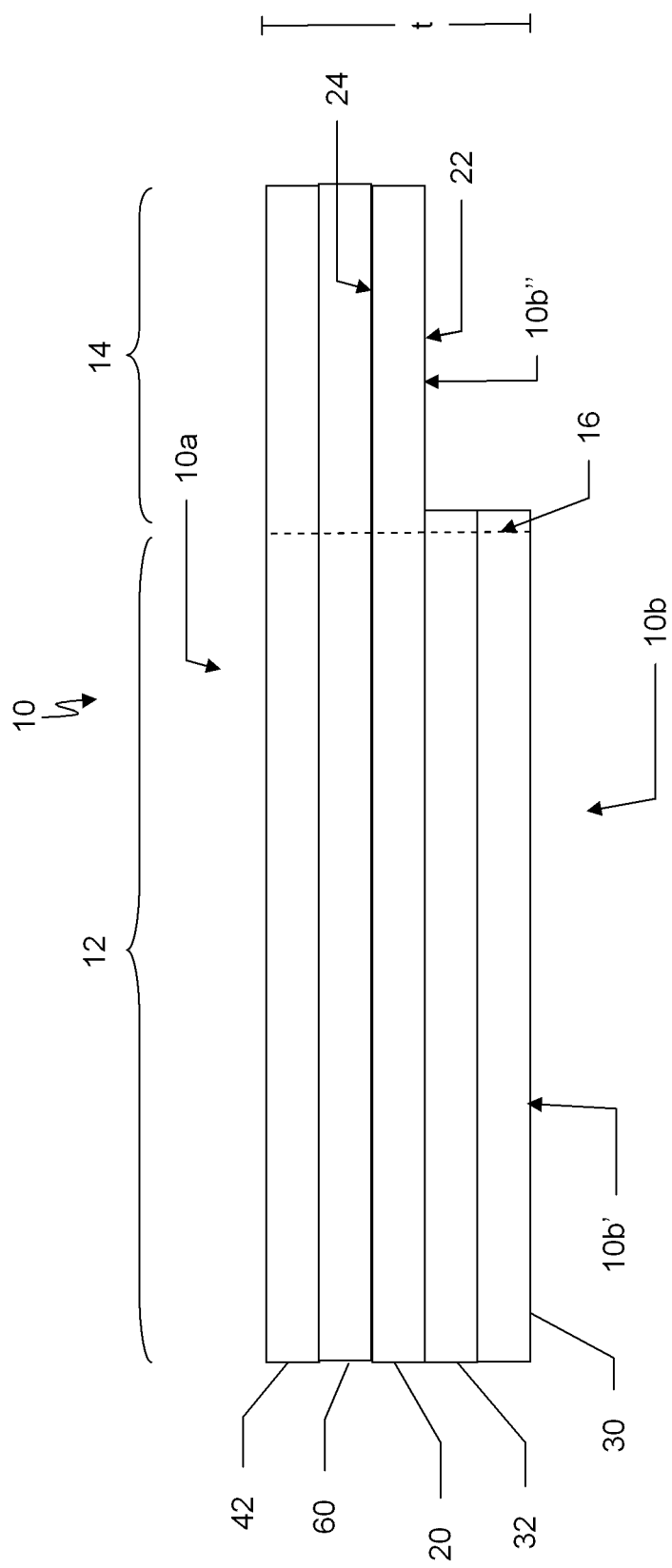
FIG. 9b is a cross section view showing an alternate embodiment of a multi-layer construction, with preprinted indicia residing below the release coat layer.

With reference to FIG. 9b, optionally the preprinted graphics and/or indicia are arranged below or underneath the release coating 42 in an indicia or printing layer 60, e.g., which can include the graphics 62 and/or 64. By arranging the indicia layer 60 under the release coating 42, when the labels are arranged in pad form as described herein, undesirable interactions between the indicia layer 60 and the adhesive layer 30 can be avoided. For example, an undesirable increase in adhesion between the labels 10 in the pad can be avoided, and the transfer of the indicia from an underlying label 10 to the adhesive surface of the overlying label 10 can also be minimized.

Figure 14:
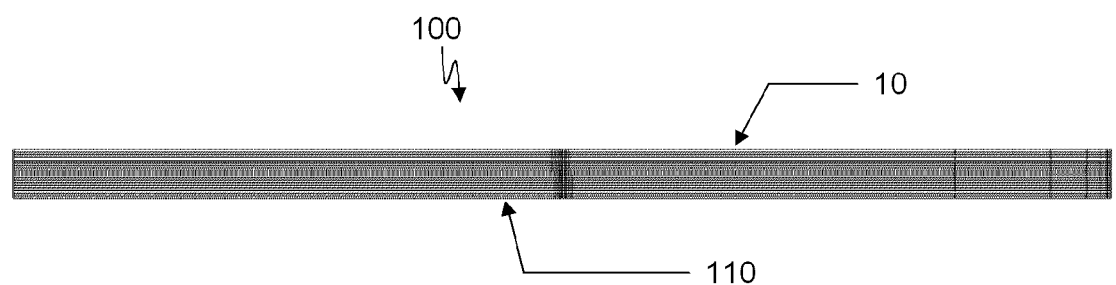
FIG. 14 is a side elevational view of the exemplary pad illustrated in FIG. 13.

As previously mentioned, suitably a plurality of labels 10 are arranged in a pad 100. Suitably, the labels 10 are stacked one on top of the other to form the pad 100, with the front surfaces 10a of each label 10 facing in substantially the same first direction (i.e. toward a top of the pad 100) and the bottom sides 10b of each label 10 facing in substantially the same opposing direction (i.e., toward a bottom of the pad 100), with the tab portions 14 substantially overlaying one another. FIGS. 13 and 14 illustrate one such exemplary pad 100 including labels 10 such as the one illustrated in FIG. 1. However, it is to be appreciated that the pad 100 can likewise include labels 10 according to any of the embodiments described or contemplated herein. In alternative embodiments, labels 10 can be stacked such that the tab portion 14 overlays the body portion 12 of the underlying label.

In addition to the labels 10, optionally the pad 100 includes a release liner 110 on the bottom of the pad 100. The release liner is also known as a carrier sheet. As shown in FIGS. 13 and 14, the release liner 110 has a similarly shaped perimeter or profile that matches the labels 10 stacked on top thereof. Suitably, the release liner 110 is formed from any suitable release liner material, e.g., such a siliconized or calendared paper or other known release liner material. In this manner, the bottom-most label 10 in the pad 100 (i.e., that label 10 immediately adjacent the release liner 110) is releasably adhered to the release liner 110 via the adhesive layer 30 on the back surface 10b of the bottom-most label 10 in the pad 100.

With reference now to FIGS. 15-18, multiple pads 100 can optionally be packaged together, e.g., in a side-by-side arrangement, to form a package. Suitably, as in the package 95 shown in FIG. 15, the pads 100 can be mounted or otherwise affixed to a support structure 200. In one embodiment, for example, the release liner 110 of each pad 100 can be secured to the support structure 200 via a suitable adhesive or the like, such as a permanent PSA. In practice, the support structure 200 can be formed from a suitably thick and/or rigid material such as cardboard, heavy-weight paper, film, or laminates thereof, or other rigid materials that can be folded or made to fold. In any event, the support structure material is substantially more rigid than the labels 10 or the release liner 110. In alternative embodiments, the support structure 200 can be coated with a release material, and a pad 100, or plurality of pads 100, can be directly mounted onto the release-coated layer of the support structure without the use of an intermediate release liner.

Figure 15:
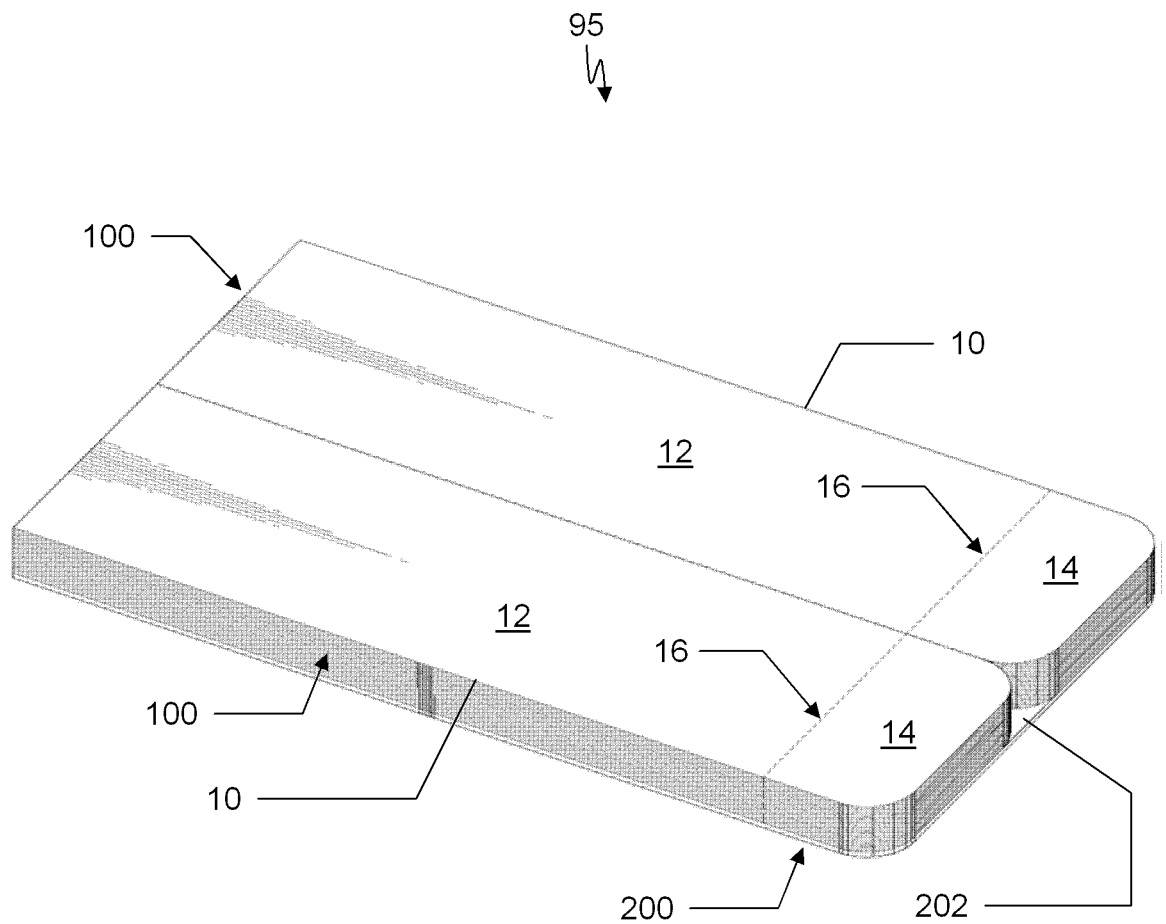
FIG. 15 is a top perspective view showing one exemplary embodiment of a multi-pad configuration (also referred to as a package) in accordance with aspects of the present inventive subject matter, the multi-pad configuration including a plurality of the pads illustrated in FIG. 13 on a shared bottom backing card.
Figure 16:
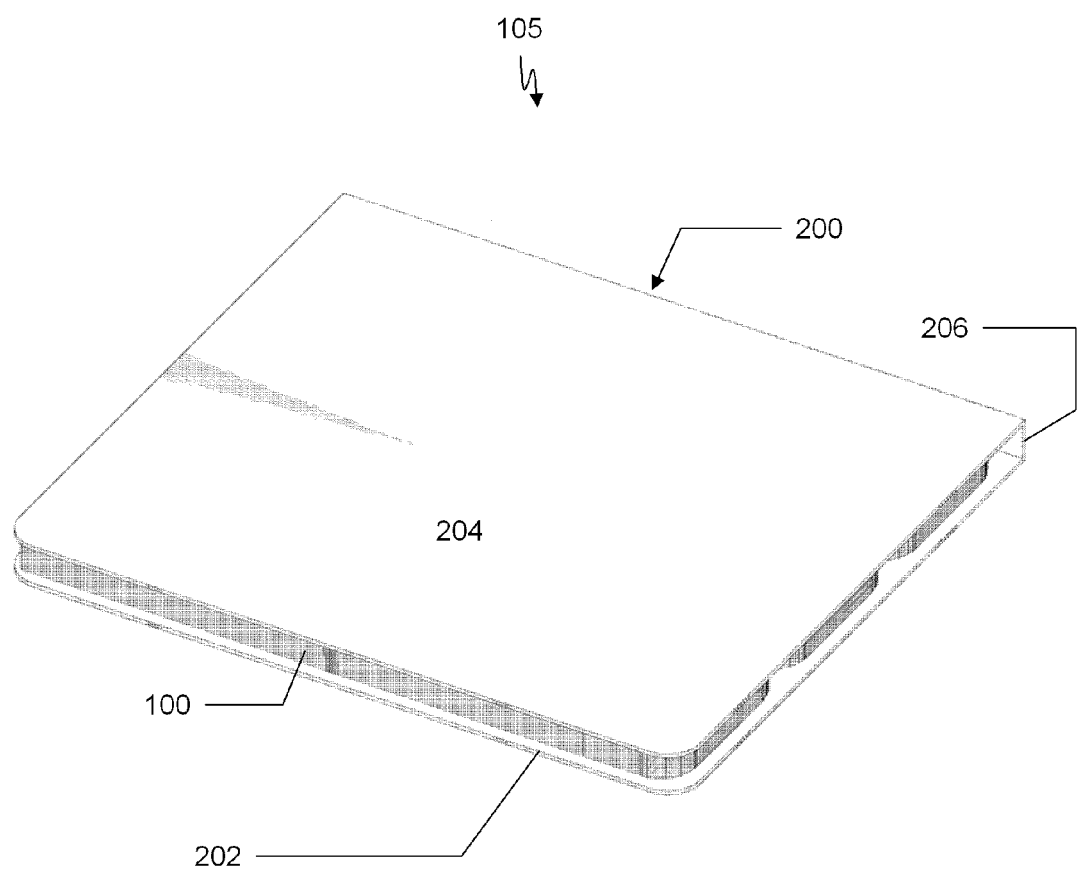
FIG. 16 is a top perspective view showing another exemplary embodiment of a multi-pad configuration (also referred to as a package) in accordance with aspects of the present inventive subject matter, the multi-pad configuration being shown with a support structure in a closed state and including a plurality of the pads illustrated in FIG. 13 attached to a base of the support structure.
Figure 17:
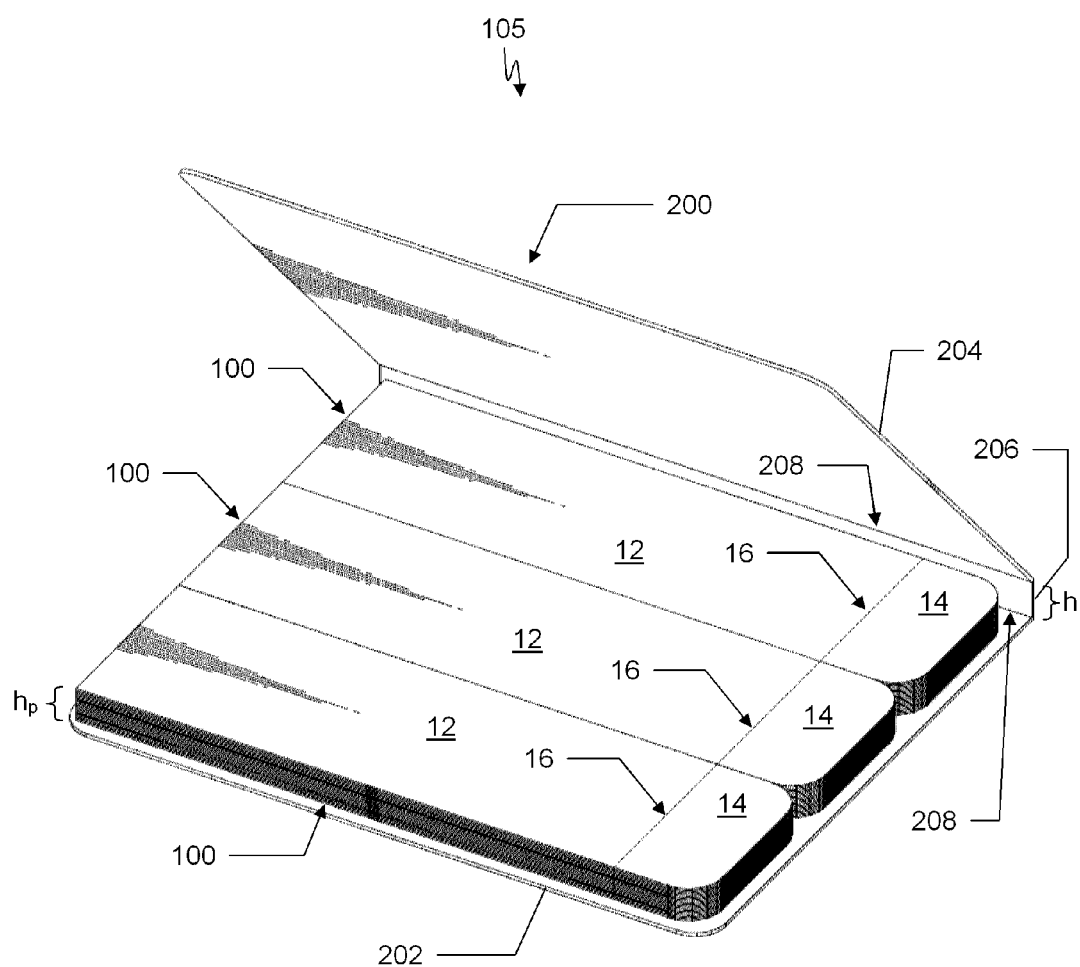
FIG. 17 is a top perspective view of the multi-pad configuration (also referred to as a package) shown in FIG. 16, with the support structure in a partially opened state.
Figure 18:
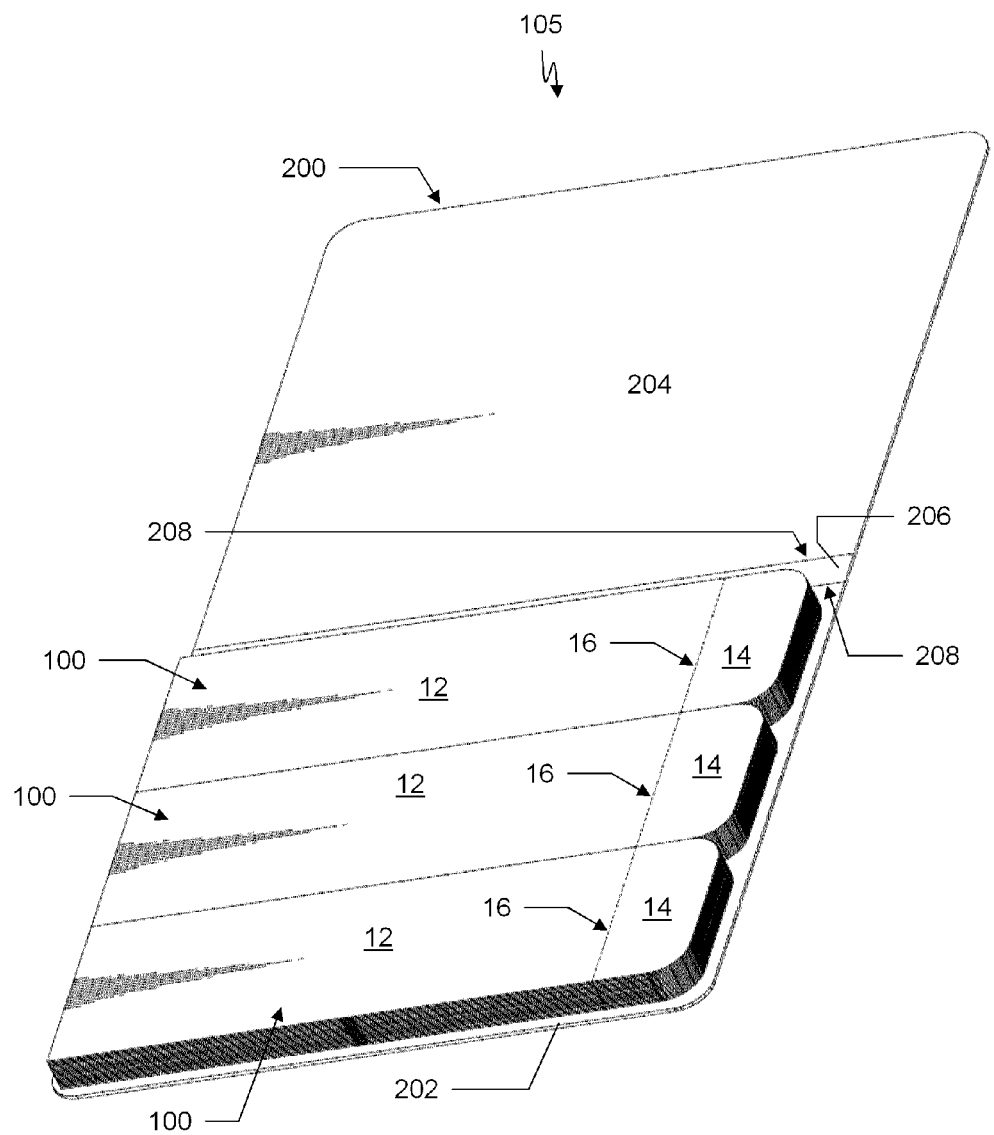
FIG. 18 is a top perspective view of the multi-pad configuration (also referred to as a package) shown in FIG. 16, with the support structure in a more fully opened state.

As shown in FIG. 15, the support structure 200 is implemented as a simple planar base 202 to which two pads 100 are attached. However, in the package 105 shown in FIGS. 16-18, the support structure 200 optionally includes, in addition to the substantially planar base 202 carrying the pads 100, a substantially planar cover 204 (also referred to as a flap) connected to the base 202 via a hinge 206 so as to be selectively opened and closed by a user. More specifically, FIG. 16 shows the cover 204 of the package in a closed position wherein the pads 100 are sandwiched between the cover 204 of the package and the base 202 to which the pads 100 are attached. FIG. 17 shows the cover 204 of the package in a partially opened position such that the pads 100 attached to the base 202 are partially revealed, and FIG. 18 shows the cover 204 of the package in a more fully opened position, where the pads 100 attached to the base 202 are more fully revealed. Suitably, the support structure 200 illustrated in FIGS. 16-18 is formed from an integral sheet of material folded along a pair of fold lines 208 that define the respective portions of the support structure 200, namely, the base 202, the hinge 206 and the cover 204. The fold lines 208 can be formed by scoring, or partial die or laser cutting, or other cutting which does not extend entirely through the support structure. Suitably, the height 'h' of the hinge 206 is made to accommodate the maximum height '$h_p$' of the pads 100 so that when the support structure 200 is in its fully closed state with the cover 204 touching the tops of the pads 100 at their maximum height '$h_p$', the cover 204 is substantially parallel to the base 202.

As shown in FIGS. 15-18, each package includes two or three pads 100. However, it is to be appreciated that in practice a given package can optionally include more pads or fewer pads 100 as desired. In particular, embodiments, such as those in FIGS. 16-18, the package can be referred to as a book or booklet. Also as shown, each package includes pads 100 of the same label 10, namely, the embodiment illustrated in FIG. 1. It is to be appreciated however that the pads 100 contained in the package can in practice include labels 10 in accordance with any of the embodiments disclosed herein, and that different pads 100 can include different label embodiments. Suitably, each pad 100 in the package includes labels 10 of the same type and a given package can include two or more different types of pads 100. For example, a given package can include different pads 100 each having labels 10 of a different size; or one pad 100 can contain labels 10 of one color and another pad 100 can contain labels of another color; or one pad 100 can include labels 10 with preprinted graphics while another pad 100 in the package includes otherwise blank labels 10.

Figure 19:
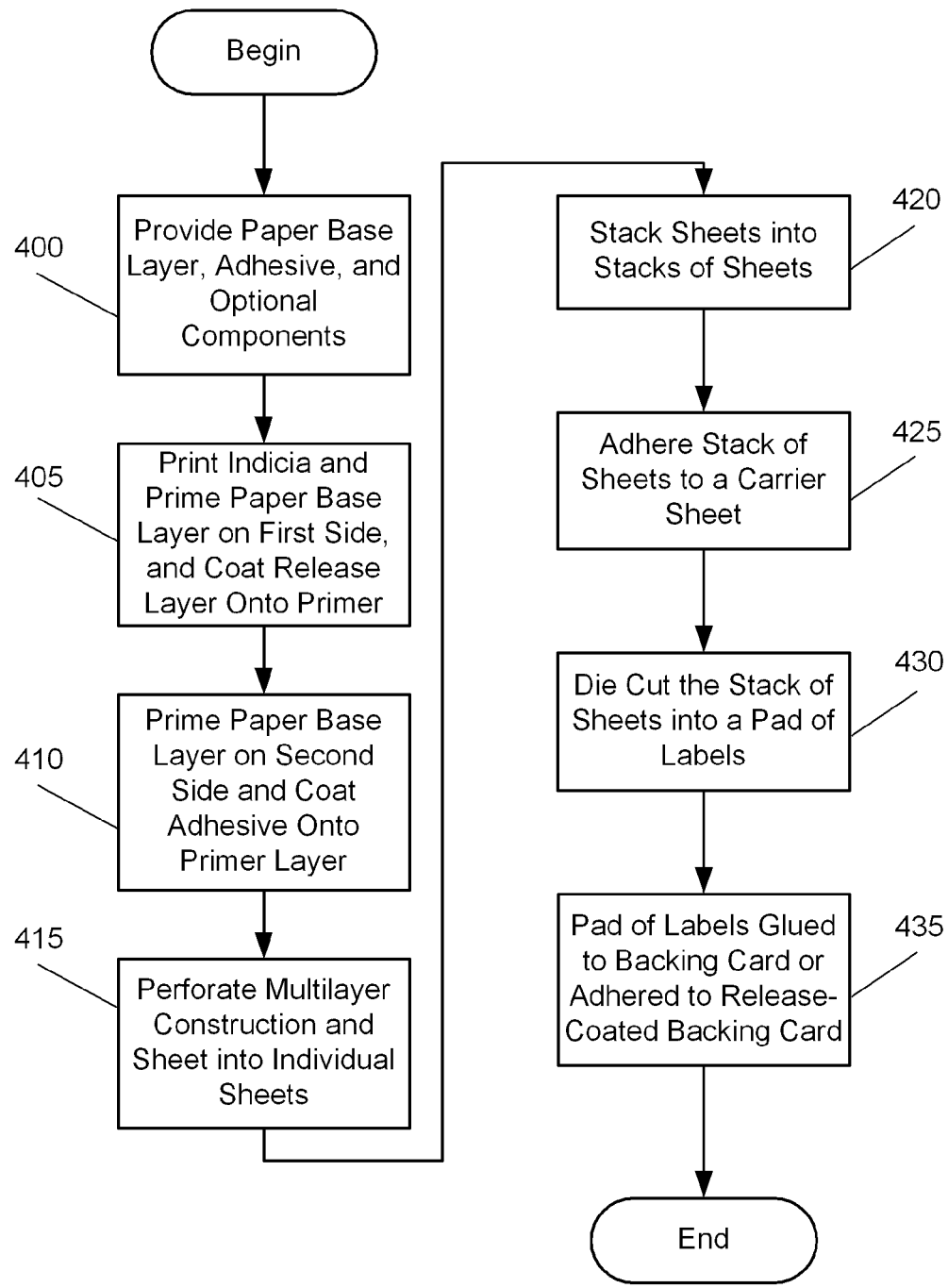
FIG. 19 is a flowchart for an exemplary method of manufacturing a package that includes a pad of labels.

An exemplary method of manufacture, as shown in FIG. 19, includes providing a paper base layer, an adhesive, and optional components such as a release material and primers in step 400. In step 405, the paper base layer is printed with indicia, if needed, coated on a first side with a primer, if needed, and followed by coating the release material, if needed. In step 410, the paper base layer is coated on a second side with a primer, if needed, followed by coating the adhesive to form label stock. The label stock is perforated and sheeted in step 415. The individual sheets are stacked upon one another to form a stack of sheets in step 420. The stack of sheets is adhered to a carrier sheet in step 425 and die cut into pads of labels in step 430. The carrier sheet on the pad is glued to a backing card, or alternatively, pads are attached to a release-coated backing card in step 435.

Figure 20:
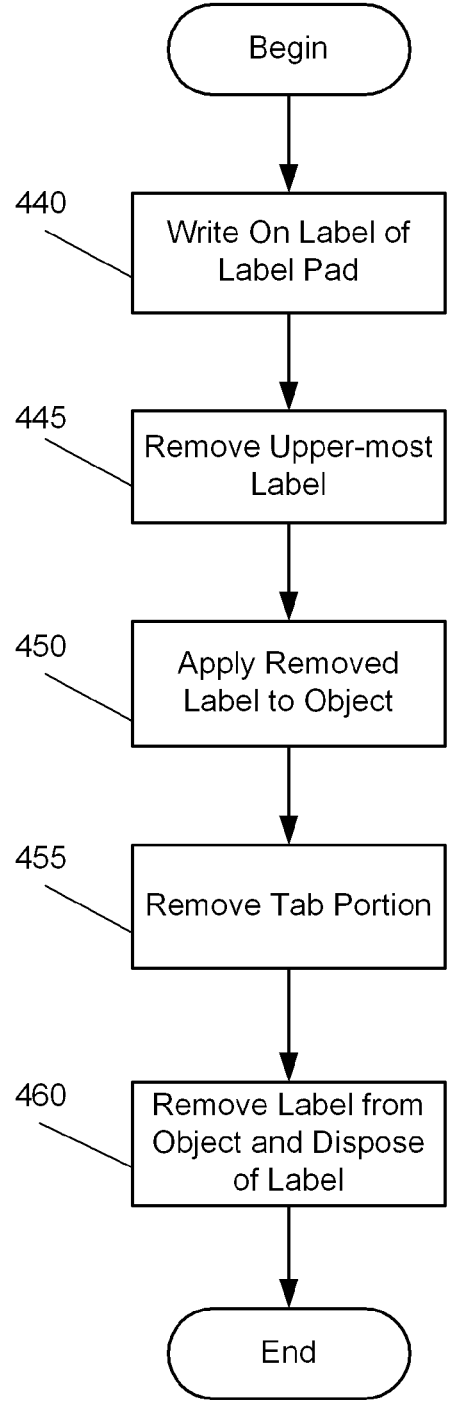
FIG. 20 is a flowchart for an exemplary method of using a pad of labels.

An exemplary method of using the labels, as shown in FIG. 20, includes writing on a label at step 440. The method also includes removing the uppermost label from the pad of labels at step 445 and applying the removed label to an object at step 450. The step of writing on the label can be performed before or after the steps of removing the label for the pad and applying the removed label to the object. The tab portion of the label is optionally removed at step 455. Optionally, when the adhered label is no longer needed or is at the end of its useful life, the label can be removed from the object with no damage to the object at step 460.

In practice, a user can selectively remove a label 10 from the pad 100, e.g., by grasping the tab portion 14 and lifting the label 10 off of the pad 100. The substantial lack of adhesive on the back surface 10b of the tab portion 14 of the label 10 results in the tab portion 14 not adhering to the underlying label 10 in the pad 100. Accordingly, the tab portion 14 remains easily grasped, e.g., between the thumb and forefinger of a user. Moreover, the substantially adhesive-free tab portion 14 provides a place for the user to grasp the label 10 without getting adhesive on their fingers or without the label sticking to their fingers.

Figure 21:
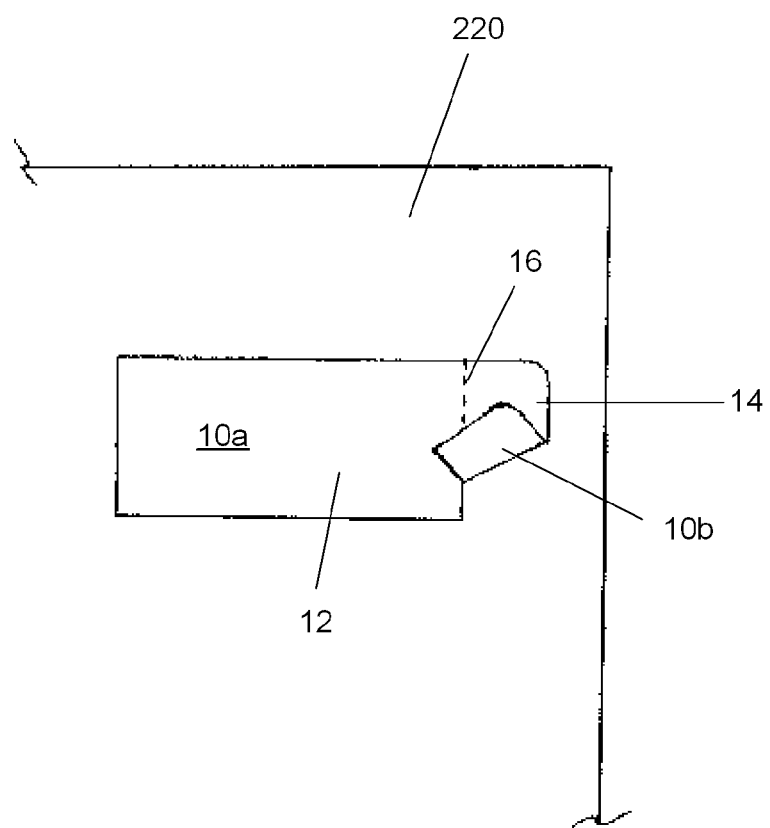
FIG. 21 is a top plan view showing the tab portion being removed from the body portion of a label after the label is attached to an object.

Via the now exposed adhesive layer 30 on the back surface 10b of the body portion of the removed label 10, the label 10 can then be selectively adhered or otherwise applied to a desired object 220, e.g., such as a page of a document, a file folder, an envelope, a storage container or bin, etc. After adhering the label 10 to an object, optionally, the user can then apply slight pressure to the front surface 10a of the applied label 10 to further secure the label 10 to the object on which it is adhered. At this point, the user can optionally remove the tab portion 14 from the body portion 12 by separating the label 10 along the line of weakness 16 (as shown in FIG. 21). For example, the user can optionally hold the body portion 12 in place, while grasping the tab portion 14 and pulling and/or tearing the tab portion 14 away from the body portion 12 so as to separate the tab portion 14 of the label 10 from the body portion 12 along the line of weakness 16. Accordingly, only the body portion 12 of the label 10 remains behind adhered to the object.

As can be appreciated, insomuch as the adhesive layer 30 covers substantially the entire body portion 12 of the back surface 10b of the label 10, the part of the label 10 remaining on the object after removal of the tab portion 14 (i.e., the body portion 12 of the label 10) is fully adhered to the object. Moreover, insomuch as the adhesive layer 30 extends partially past the line of weakness 16 onto the back surface 10b of the tab portion 14 of the label 10, it is assured that the adhesive layer 30 comes completely to the edge of the body portion 12 of the label 10 defined by the line of weakness 16. In this manner, when the label 10 is adhered to an object and the tab portion 14 removed as described herein, the adhesive layer 30 is assured to extend to the edge of the body portion 12 of the label 10 defined by the line of weakness 16, and hence full adhesion of the body portion 12 of the label 10 to the object can be obtained all the way to the aforementioned edge. That is to say, after removal of the tab portion 14, the edge of the body portion 12 of the label 10 defined by the line of weakness 16 will be protected against unwanted detachment from the object insomuch as the adhesive layer 30 is assured to extend all the way to that edge.

Alternatively, the user can opt to leave the tab portion 14 connected after application of the label 10. In this way, insomuch as the adhesive layer 30 is a removable and/or repositionable adhesive, the user can selectively remove the label 10 from an object to which it was adhered and/or reposition the same by again grasping the substantially adhesive-free tab portion 14 and manipulating the label 10 as desired.

In any event, it is to be appreciated that in connection with the particular exemplary embodiment(s) presented herein certain structural and/or functional features are described as being incorporated in defined elements and/or components. However, it is contemplated that these features can, to the same or similar benefit, also likewise be incorporated in other elements and/or components where appropriate. It is also to be appreciated that different aspects of the exemplary embodiments can be selectively employed as appropriate to achieve other alternate embodiments suited for desired applications, the other alternate embodiments thereby realizing the respective advantages of the aspects incorporated therein.

Additionally, it is to be appreciated that certain elements described herein as incorporated together can, under suitable circumstances, be stand-alone elements or otherwise divided. Similarly, a plurality of particular functions described as being carried out by one particular element can be carried out by a plurality of distinct elements acting independently to carry out individual functions, or certain individual functions can be split-up and carried out by a plurality of distinct elements acting in concert. Alternatively, some elements or components otherwise described and/or shown herein as distinct from one another can be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A package comprising:
   plurality of pads; and
   a support structure including a base portion to which the plurality of pads are secured;
   wherein:
   each pad including:
   a plurality of labels, each of the plurality of labels including:
   a base layer including:
   a front surface,
   a body portion having an area, and a back surface,
   a tab portion having an area and a back surface, the tab portion integrally coupled to the body portion and extending from an end of the body portion,
   a line of weakness dividing the tab portion and the body portion, the line of weakness being formed such that the tab portion is separable from the body portion along the line of weakness,
   an indicia layer provided on the front surface of the base layer,
   a release layer provided on the indicia layer such that the indicia layer is between the release layer and the base layer,
   a layer of adhesive provided on the back surface of the body portion of the label, and the layer of adhesive extending beyond the line of weakness with a majority of the back surface of the tab portion of the label free of adhesive, and the area of the tab portion is less than the area of the body portion; and the plurality of labels including an overlying label having a back surface and an underlying label adjacent to the overlying label, the underlying label having a front surface;

the plurality of labels are stacked one on top of the other such that the overlying label is releasably adhered to the release layer of the adjacent underlying label via the adhesive layer on the back surface of the overlying label.

2. The package according to claim 1, wherein the support structure further comprises:

a cover joined to the base portion by a hinge such that the cover is selectively swingable about the hinge between a closed position in which at least one of the plurality of pads is sandwiched between the cover and the base portion of the support structure and an open position in which the at least one pad is revealed from underneath the cover.

3. The package according to claim 2, wherein the base portion of the support structure, the cover, and the hinge are all formed from an integral piece of material.

4. The package according to claim 3, wherein the hinge includes a pair of fold lines formed in the integral piece of material, the fold lines separating the cover and the base portion.

5. The package according to claim 1, wherein at least one of the plurality of labels includes a pair of notches formed in the edges of the label, the notches being co-located with opposing ends of the line of weakness.

6. The package according to claim 1, wherein the layer of adhesive includes an adhesive selected from the group including a removable pressure sensitive adhesive and an ultra-removable pressure sensitive adhesive.

7. The package according to claim 1, wherein the indicia layer includes a preprinted graphic.

8. The package according to claim 7, wherein the graphic includes a loop arranged proximate to a border of the body portion of the label.

9. The package according to claim 8, wherein the graphic includes a stripe arranged proximate to at least one edge of the label.

* * * * *